(12) United States Patent
Hwang et al.

(10) Patent No.: US 7,283,454 B2
(45) Date of Patent: Oct. 16, 2007

(54) INFORMATION STORAGE MEDIUM AND METHOD OF RECORDING INFORMATION THEREON

(75) Inventors: Sung-hee Hwang, Seoul (KR);
Kyung-geun Lee, Gyeonggi-do (KR);
Jung-wan Ko, Gyeonggi-do (KR);
In-sik Park, Gyeonggi-do (KR);
Du-seop Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 655 days.

(21) Appl. No.: 10/630,735

(22) Filed: Jul. 31, 2003

(65) Prior Publication Data

US 2004/0257936 A1 Dec. 23, 2004

(30) Foreign Application Priority Data

Jul. 31, 2002 (KR) .................... 10-2002-0045367
Oct. 22, 2002 (KR) .................... 10-2002-0064663
Oct. 26, 2002 (KR) .................... 10-2002-0065674
Oct. 29, 2002 (KR) ............................ 2002-66238
Nov. 29, 2002 (KR) .................... 10-2002-0075303

(51) Int. Cl.
*G11B 7/00* (2006.01)

(52) U.S. Cl. ................................ 369/275.3; 369/47.21
(58) Field of Classification Search ............ 369/275.3, 369/47.1, 47.27, 47.28, 59.25, 53.22, 47.21
See application file for complete search history.

(56) References Cited

U.S. PATENT DOCUMENTS

| 6,552,982 | B1 * | 4/2003 | Fukushima et al. | 369/47.52 |
| 6,785,196 | B2 * | 8/2004 | Bakx et al. | 369/30.07 |
| 7,102,972 | B2 * | 9/2006 | Lee et al. | 369/53.17 |

FOREIGN PATENT DOCUMENTS

| JP | 3-203858 | 9/1991 |
| JP | 7-326116 | 12/1995 |
| JP | 11-224167 | 8/1999 |

* cited by examiner

*Primary Examiner*—Nabil Hindi
(74) *Attorney, Agent, or Firm*—Stein, McEwen & Bui, LLP

(57) ABSTRACT

An information storage medium (a disc) includes an area and a user data area. The area includes a recordable zone having a drive & disc zone in which information on a drive and information on a state of the disc are recorded. The drive & disc zone includes a plurality of physical clusters or ECC blocks and the information on the drive and the information on the state of the disc are recorded in the same physical cluster or ECC block or different physical clusters or ECC blocks.

48 Claims, 21 Drawing Sheets

FIG. 1

| LEAD-IN AREA | DESCRIPTION | USE PURPOSE |
|---|---|---|
| READ-ONLY ZONE (5) | PITS OR HIGH FREQUENCY WOBBLES | DISC-RELATED CONTROL DATA |
| RECORDABLE ZONE (10) | DMA (10a) | DEFECT MANAGEMENT |
| | CONTROL DATA ZONE (10b) | DATA INFORMATION (CONTROL DATA) |
| | OPC TEST ZONE (10c) | OPC TESTING (OPC DATA) |
| | DRIVE & DISC ZONE (10d) | INFORMATION ON DRIVE AND INFORMATION ON THE STATE OF DISC |
| | BUFFER ZONE (10e) | BUFFER FOR USER DATA AREA |

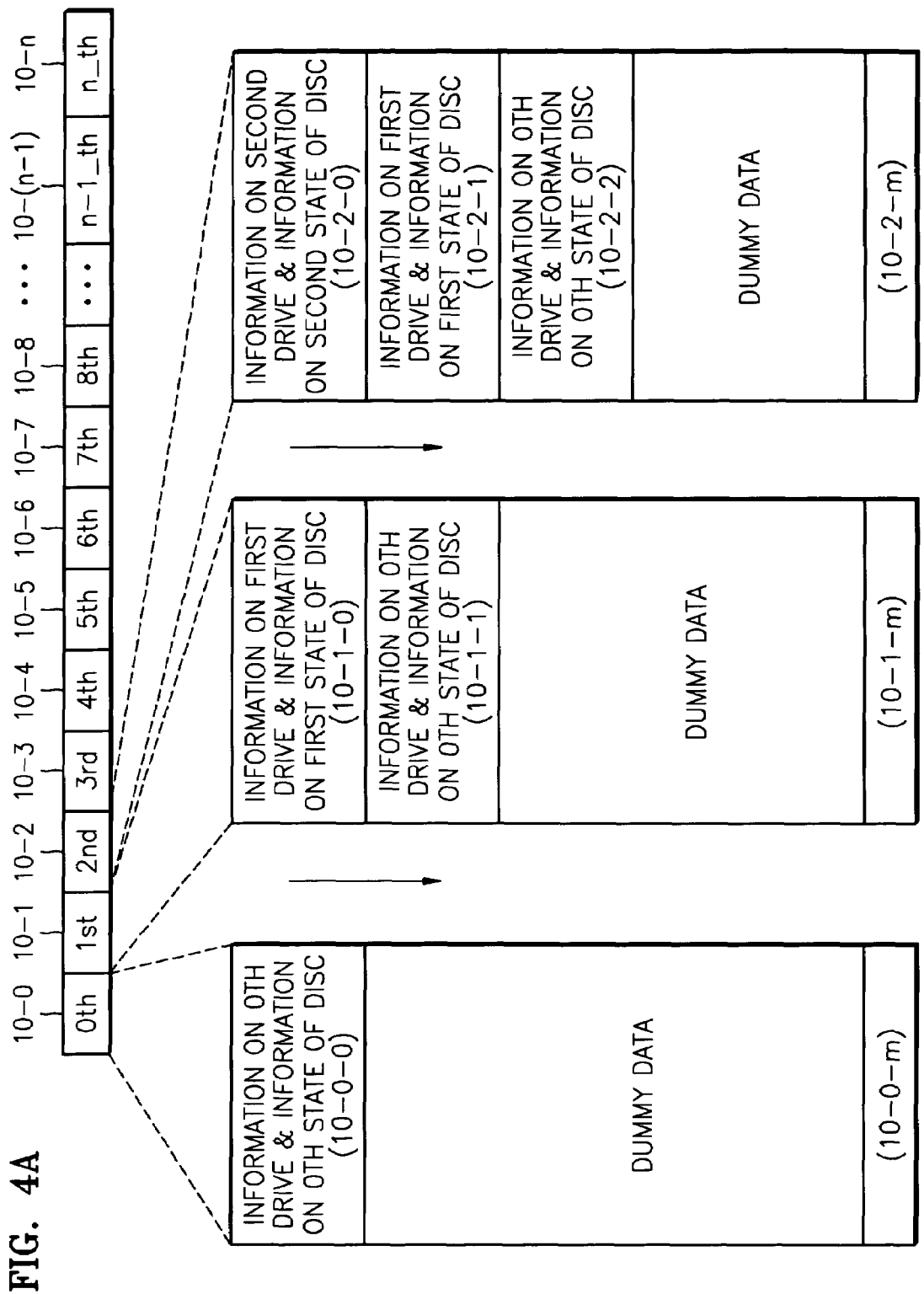

FIG. 6A

| LEAD-IN AREA | DESCRIPTION | USE PURPOSE |
|---|---|---|
| READ-ONLY ZONE (5) | PITS OR HIGH FREQUENCY WOBBLES | DISC-RELATED CONTROL DATA |
| RECORDABLE ZONE (10) | DMA (10a) | DEFECT MANAGEMENT |
| | CONTROL DATA ZONE (10b) | DATA INFORMATION (CONTROL DATA) |
| | OPC TEST ZONE (10c) | OPC TESTING (OPC DATA) |
| | DRIVE & DISC ZONE (10d) | DRIVE-RELATED INFORMATION |
| | | DISC STATE-RELATED INFORMATION |
| | BUFFER ZONE (10e) | BUFFER FOR USER DATA ZONE |

FIG. 14A

| 8BITS | 28BITS | 28BITS |
|---|---|---|
| STATE INFORMATION | LAST RECORDED ADDRESS | LAST REPLACED ADDRESS |

FIG. 14B

| 4BITS | 28BITS | 4BITS | 28BITS |
|---|---|---|---|
| STATE INFORMATION 1 | LAST RECORDED ADDRESS | STATE INFORMATION 2 | LAST REPLACED ADDRESS |

FIG. 14C

| 8BITS | 28BITS | 28BITS |
|---|---|---|
| STATE INFORMATION OF RECORDING LAYER 0 | LAST RECORDED ADDRESS | LAST REPLACED ADDRESS |
| STATE INFORMATION OF RECORDING LAYER 1 | LAST RECORDED ADDRESS | LAST REPLACED ADDRESS |

FIG. 14D

| 4BITS | 28BITS | 4BITS | 28BITS |
|---|---|---|---|
| STATE INFORMATION OF RECORDING LAYER 0 | LAST RECORDED ADDRESS | STATE INFORMATION 2 OF RECORDING LAYER 0 | LAST REPLACED ADDRESS |
| STATE INFORMATION OF RECORDING LAYER 1 | LAST RECORDED ADDRESS | STATE INFORMATION 2 OF RECORDING LAYER 1 | LAST REPLACED ADDRESS |

INFORMATION STORAGE MEDIUM AND METHOD OF RECORDING INFORMATION THEREON

CROSS-REFERENCE TO RELATED APPLICATIONS

This application claims benefit of Korean Patent Application Nos. 2002-45367, 64663, 65674, 66238, and 75303, filed on Jul. 31, Oct. 22, 26, and 29, and Nov. 29, 2002, respectively, in the Korean Intellectual Property Office, the disclosures of which are incorporated herein by reference.

BACKGROUND OF THE INVENTION

1. Field of the Invention

The present invention relates to an information storage medium on which information on a drive and information on a state of the information storage medium are recorded in a zone of a recordable area and a method of recording information thereon.

2. Description of the Related Art

Generally, where a 4.7 GB digital versatile disc-random access memory (DVD-RAM) is loaded into a drive, information on the drive, e.g., information on a drive maker, a serial number, and so forth, is recorded in a rewritable identification zone of a lead-in area of the disc. A 20 GB high-density (HD)-DVD also has a lead-in area including a drive zone with a plurality of physical clusters so as to record information on a used drive in the drive zone.

In particular, since information is recorded only once in an optimum power control (OPC) zone necessary to test a disc or a drive information zone of a once-writable information storage medium, the once-writable information storage medium requires updated information on its state as well as information on a used drive so as to have the drive rapidly access the once-writable information storage medium when recording additional user data in unrecorded zones after recording user data.

Accordingly, a method of efficiently recording new information regarding a new drive and a particular state of the disc should be proposed to satisfy a new format of an information storage medium.

SUMMARY OF THE INVENTION

Accordingly, it is an aspect of the present invention to provide an information storage medium on which information on a drive and information on a state of the medium can be recorded in a zone comprising a plurality of error correcting code (ECC) blocks or physical clusters, so as to have the drive rapidly access the medium using the recorded information and have user data be efficiently recorded and/or reproduced, and a method of recording information thereon.

Additional aspects and/or advantages of the invention will be set forth in part in the description which follows and, in part, will be obvious from the description, or may be learned by practice of the invention.

To achieve the above and/or other aspects of the present invention, there is provided an information storage medium comprising an area and a user data area. The area includes a recordable zone having a drive & disc zone in which information on a drive and information on a state of the storage medium are recorded. The drive & disc zone includes a plurality of physical clusters or error correction code (ECC) blocks and the information on the drive and the information on the state of the storage medium are recorded in at least one of the physical clusters or ECC blocks.

Whenever the information on the drive and the information on the state of the storage medium are updated, the updated information may be recorded in a physical cluster or ECC block different from a physical cluster or ECC block in which information on a previous drive and information on a previous state of the storage medium are recorded. The updated information may be recorded in a physical cluster or ECC block following a physical cluster or ECC block in which information on a last drive and information on a last state of the storage medium are recorded.

Each of the plurality of physical clusters or ECC blocks may comprise a plurality of recording units, and the information on the drive and the information on the state of the storage medium may be sequentially recorded in different recording units or the same recording unit of a physical cluster or ECC block.

Information on a new drive and information on a latest state of the storage medium may be recorded in a starting recording unit of a physical cluster or ECC block, and the information on the drive and the information on the state of the storage medium may be copied into a recording unit right after the starting recording unit.

To achieve the above and/or other aspects of the present invention, there is provided another information storage medium comprising an area and a user data area. The area includes a recordable zone having a drive & disc zone in which information on a drive and information on a state of the storage medium are recorded. The drive & disc zone includes a plurality of physical clusters or ECC blocks and the information on the drive and the information on the state of the storage medium are recorded in different physical clusters or ECC blocks.

The information on the drive and the information on the state of the storage medium may be sequentially and alternately recorded starting from a beginning part of the drive & disc zone. On the other hand, the drive & disc zone may be divided into two zones, and one of the information on the drive and the information on the state of the storage medium may be recorded in a first zone of the two zones and the remaining information may be recorded in a second zone of the two zones.

The information on the state of the storage medium may include at least one of an address of a zone in which new OPC data is recorded, an address of a zone in which information on a last drive and information on a latest state of the storage medium are recorded, a last recorded address of a zone in which user data is lastly recorded, information on a number of sessions, write protection information, information for indicating whether additional user data is recordable after recording the user data, and information necessary for indicating an address of a zone in which information on a subsequent drive and information on a subsequent state of the storage medium are to be recorded or information necessary for indicating an address of a zone in which the user data is to be recorded.

To achieve the above and/or other aspects of the present invention, there is also provided a method of recording information on an information storage medium, the method comprising recording information on a drive and information on a state of the storage medium in one of a plurality of physical clusters or ECC blocks of a drive & disc zone of a recordable zone included in an area except a user data area of the storage medium, and recording information on a new drive and information on a latest state of the storage medium in a physical cluster or ECC block different from a physical cluster or ECC block in which the information on the drive and the information on the state of the storage medium are recorded, whenever the information on the drive and the information on the state of the storage medium are updated.

To achieve the above and/or other aspects of the present invention, there is provided another method of recording information on an information storage medium, the method comprising recording information on a drive and information on a state of the storage medium in different physical clusters or ECC blocks of a plurality of physical clusters or ECC blocks of a drive & disc zone of a recordable zone included in an area except a user data area of the storage medium, and recording information on a new drive and information on a latest state of the storage medium in a physical cluster or ECC block different from a physical cluster or ECC block in which the information on the drive and the information on the state of the storage medium are recorded, whenever the information on the drive and the information on the state of the storage medium are updated.

To achieve the above and/or other aspects of the present invention, there is provided yet another method of recording information on an information storage medium, the method comprising recording information on a state of the storage medium and information on a drive in one of a plurality of physical clusters or ECC blocks of a drive & disc zone of a recordable zone included an area except a user data area of the storage medium, and recording updated information on the state of the storage medium and updated information on the drive in a physical cluster or ECC block following the physical cluster or ECC block in which the information on the state of the storage medium and the information on the drive are recorded. The information on the drive is copied after recording the updated information on the drive.

The updated information on the state of the storage medium may be recorded in a $0^{th}$ recording unit of a predetermined physical cluster or ECC block, the updated information on the drive may be recorded in a first recording unit right after the $0^{th}$ recording unit, and information on previous drives may be sequentially copied into recording units after the first recording unit.

The updated information on the drive may be recorded in a $0^{th}$ recording unit of a predetermined physical cluster or ECC block, information on previous drives may be sequentially copied into recording units after the $0^{th}$ recording unit, and the updated information on the state of the storage medium may be recorded in a recording unit right after a last one of the recording units into which the information on the previous drives is copied.

To achieve the above and/or other aspects of the present invention, there is provided still another method of recording information on an information storage medium, the method comprising, whenever information on a state of the storage medium is updated, recording updated information on the state of the storage medium in different physical clusters or ECC blocks of a plurality of physical clusters or ECC blocks of a drive & disc zone of a recordable zone included an area except a user data area of the storage medium, and selectively recording updated information on a drive in a physical cluster or ECC block in which information on the state of the storage medium is recorded.

In response to the updated information on the state of the storage medium being recorded in a starting recording unit of a predetermined physical cluster or ECC block and the updated information on the drive not being recorded, the copying of the information on the previous drive may comprise copying the information on the previous drive into a recording unit following the starting recording unit.

In response to the updated information on the state of the storage medium recorded in a last recording unit of a predetermined physical cluster or ECC block and the updated information on the drive not being recorded, the copying of the information on the previous drive may include sequentially copying information on previous drives starting from a beginning recording unit of the predetermined physical cluster or ECC block.

BRIEF DESCRIPTION OF THE DRAWINGS

These and/or other aspects and advantages of the invention will become apparent and more readily appreciated from the following description of the embodiments taken in conjunction with the accompanying drawings in which:

FIG. 1 is a view illustrating a data structure of a lead-in or lead-out area according to the present invention;

FIGS. 4A and 4B are views for explaining an information storage medium and a method of recording information thereon according to yet another embodiment of the present invention;

FIGS. 6A and 6B are views for explaining an information storage medium and a method of recording information thereon according to still another embodiment of the present invention;

FIGS. 14A through 14D are views for explaining examples of a format of state address information according to the present invention.

DETAILED DESCRIPTION OF THE PREFERRED EMBODIMENTS

Figure 2:
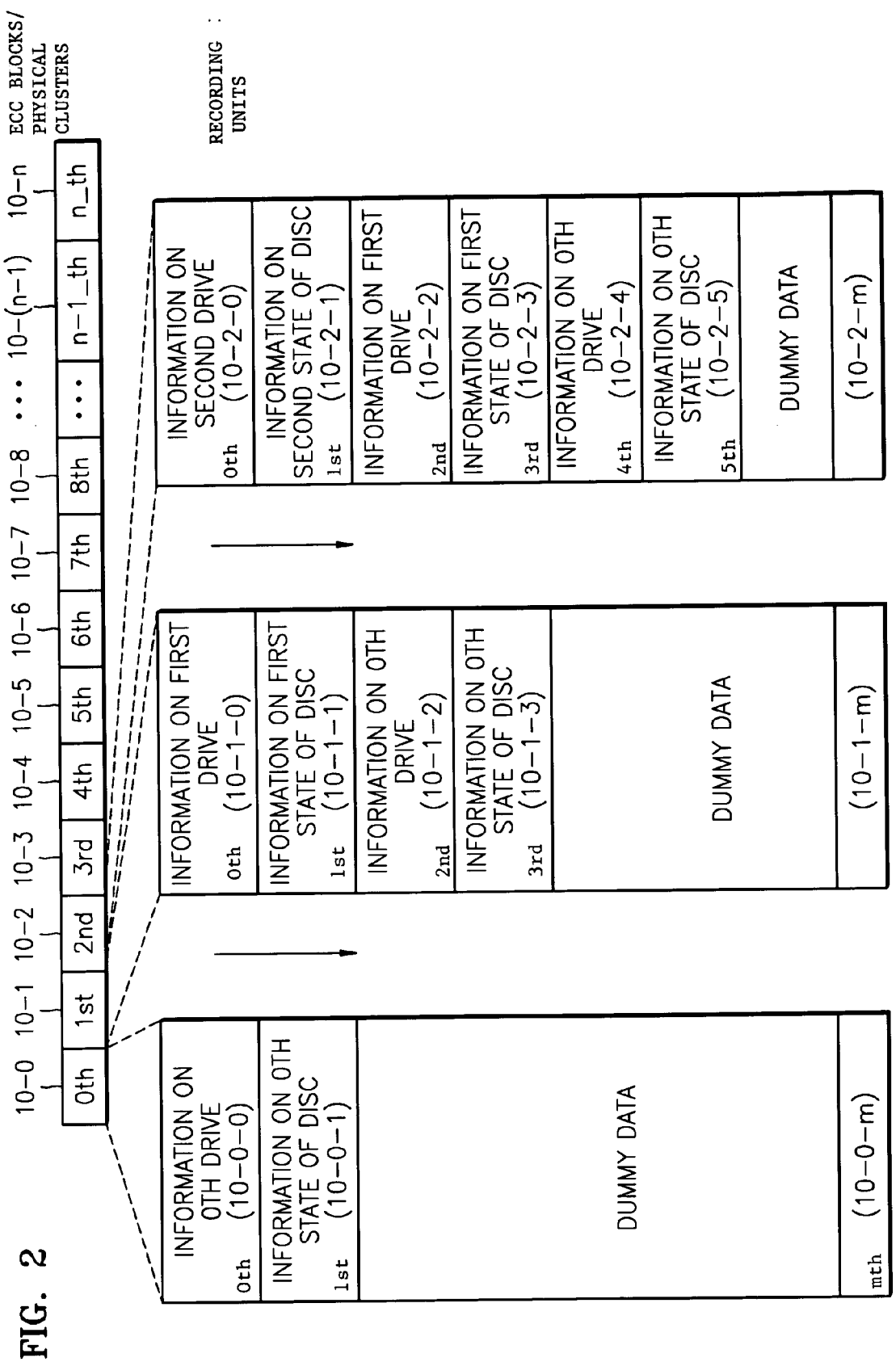
FIG. 2 is a view for explaining an information storage medium and a method of recording information thereon according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 shows a physical structure of a lead-in area having a predetermined diameter starting from a central hole of an information storage medium, for example, a disc, according to an embodiment of the present invention. The lead-in area includes a read-only zone 5 in which data is pre-recorded and a recordable zone 10. Disc-related control data is pre-recorded as pits or high frequency wobbles in the read-only zone 5 when, for example, manufacturing the disc, and is only readable.

The recordable zone 10 includes a defect management area (DMA) 10a in which information for handling and managing defects on the disc is recorded, a control data zone 10b, an OPC test zone 10c in which information for optimally controlling a power is recorded, and a buffer zone 10e.

Here, the recordable zone 10 further includes a drive & disc zone 10d in which information on a drive and information on a state of the disc are recorded. The drive & disc zone 10d comprises a plurality of physical clusters or ECC blocks, each of which may include a plurality of recording units such as sectors or data frames.

The information on the drive includes information on a manufacturer, manufacturing company-related information, a manufacture number, a serial number of the drive, and so forth.

The information on the state of the disc includes at least one of an address of a zone in which new OPC data is recorded, an address of a zone in which information on a last drive is recorded, a last recorded address of a zone of a user data area in which user data is lastly recorded, information on the number of sessions, write protection information, and information for indicating whether additional user data is recordable in a user data area after recording write user data.

The information on the state of the disc may include state address information. The state address information includes state information including information on a recording mode, the type of a file system, and a recording layer on which user data is recorded, the last recorded address of a zone of the user data area in which user data is lastly recorded, and a last replaced address of a zone of an outer spare area in which data is replaced to manage defects on the disc.

According to an embodiment of the present invention, information on the drive and the information on the state of the disc are recorded in the drive & disc zone 10d of the disc having the plurality of physical clusters or ECC blocks. In this case, each time information on a new drive is recorded and the information on the state of the disc is updated, the information is recorded in a physical cluster or ECC block different from one of the plurality of physical clusters or ECC blocks in which the information on the previous drive and the information on the previous state of the disc are recorded. For example, whenever information on a new drive is recorded and the information on the state of the disc is updated, the information on the new drive and the updated information on the state of the disc are recorded in a physical cluster or ECC block following the physical cluster or ECC block in which the information on the previous drive and the information on the previous state of the disc are recorded. The drive & disc zone 10d may be included in each of areas except the user data area. For example, the drive & disc zone 10d may be included in at least one of the lead-in area and a lead-out area (not shown). The lead-out area may have a similar structure to the lead-in area.

FIG. 2 shows a drive & disc zone 10d of an information storage medium, for example, a disc, according to an embodiment of the present invention. The drive and disc zone 10d includes (n+1) physical clusters or ECC blocks ranging from a $0^{th}$ physical cluster or ECC block 10-0 to a $n^{th}$ physical cluster or ECC block 10-n. Each of the (n+1) physical clusters or ECC blocks may comprise a plurality of recording units such as sectors or data frames. Hereinafter, only physical clusters will be described for convenience. For example, the $0^{th}$ physical cluster 10-0 comprises m+1 recording units ranging from a $0^{th}$ recording unit 10-0-0 to an $m^{th}$ recording unit 10-0-m.

In this embodiment, information on a drive and information on a state of the disc are recorded in a physical cluster. For example, information on a $0^{th}$ drive is recorded in the $0^{th}$ recording unit 10-0-0 of a $0^{th}$ physical cluster 10-0, and information on a $0^{th}$ state of the disc is recorded in a first recording unit 10-0-1 of the $0^{th}$ physical cluster 10-0. Dummy data is recorded in remaining recording units of the $0^{th}$ physical cluster. Thereafter, where a new drive records data on and/or reproduce data from the disc, information on the new drive, i.e., information on a first drive, is recorded in a $0^{th}$ recording unit 10-1-0 of a first physical cluster 10-1 after the $0^{th}$ physical cluster 10-0. Here, the information on the state of the disc is updated, i.e., information on a first state of the disc is recorded in a first recording unit 10-1-1 of the first physical cluster 10-1. The information on the $0^{th}$ drive and the information on the $0^{th}$ state of the disc are copied from the $0^{th}$ and first recording units of the $0^{th}$ physical cluster into a second recording unit 10-1-2 and a third recording unit 10-1-3 of the first physical cluster 10-1, respectively.

Where a new drive, i.e., a second drive, records data on the disc, information on the second drive and information on a second state of the disc are recorded in a second physical cluster 10-2 following a physical cluster in which data is lastly recorded, i.e., the first physical cluster 10-1. Here, the information on the second drive is recorded in a $0^{th}$ recording unit 10-2-0 of the second physical cluster 10-2, and the information on the second state of the disc is recorded in a first recording unit 10-2-1 of the second physical cluster 10-2. The information on the first drive, the information on the first state of the disc, the information on the $0^{th}$ drive, and the information on the $0^{th}$ state of the disc are copied into second, third, fourth, and fifth recording units 10-2-2, 10-2-3, 10-2-4, and 10-2-5 of the second physical cluster 10-2, respectively, following the $0^{th}$ and first recording units 10-2-0 and 10-2-1.

As described above, every time information on a new drive and information on a new state of a disc are recorded in a physical cluster following a physical cluster in which information on a previous drive and information on a previous state of the disc are recorded, the information on the previous drive and the information on the previous state of the disc are also recorded in the physical cluster in which the information on the new drive and the information on the new state of the disc are recorded. This is to inform a new drive of information on a previous drive and the history of the state of the disc. Information on the new drive and information on the new state of the disc are recorded in starting sections of a physical cluster and the information on the previous drive and the information on the previous state of the disc are copied into sections of the physical cluster following the starting sections. Therefore, a user can obtain information on all used drives and information on all states of the disc by reproducing the physical cluster in which the information on the new drive and the information on the new state of the disc are recorded, without reproducing the physical cluster in which the information on the previous drive and the information on the previous states of the disc are recorded. As a result, the user can efficiently manage a new drive or efficiently check the state of a disc.

As previously described, the information on the state of the disc includes an address of a zone in which new OPC data is recorded, an address of a zone in which information on a last drive is recorded, a last recorded address of a zone of a user data area in which user data is lastly recorded, write protection information, and information for indicating whether additional user data is recordable in the user data area after recording the user data. This will be explained in detail below.

Information on a recording and/or reproduction power necessary for recording and/or reproducing user data is recorded in the OPC test zone 10c whenever user data is recorded, and the recording and/reproduction power can be adjusted to an optimum state using this information. New data corresponding to a power used whenever recording is performed is recorded as the information on the recording and/or reproduction power. In particular, in an event that a once-writable optical information storage medium is used, OPC data is recorded in a new zone in which data was not previously recorded whenever new data is recorded. Where new data is recorded after recording of data is completed, a zone in which new OPC data is to be recorded has to be found. Accordingly, for example, an address of the zone in which new OPC data is recorded is written to a predetermined zone so that a used drive can rapidly access it. In other words, the drive can quickly access a zone in which new OPC data is to be recorded when recording new OPC data by recording an address of a zone in which OPC data is lastly recorded in the drive & disc zone 10d, and reproducing the address of the zone in which OPC data is lastly recorded without reproducing all zones in which OPC data is recorded.

The information on the drive and information on the state of the disc are updated whenever a new drive records information on the disc. Thus, an address of a zone in which information on a lastly used drive and information on a last state of the disc, may be recorded as the information on the state of the disc. Thereafter, a position in which information on a new drive or information on a new state of the disc is to be recorded can be easily found, where recording information on the new drive, by reproducing the address of the zone in which information on the lastly used drive and the last state of the disc is recorded.

Where recording of user data stops, and then new user data is recorded, a pickup has to find out and access a zone in which user data is to be recorded. Thus, an address of a zone in which user data is lastly recorded may be recorded in the drive & disc zone 10d so as to allow the pickup to have rapid access to the zone in which user data is to be recorded.

Instead of the address of the zone in which the information on the last drive and the information on the last state of the disc are recorded, or the address of the zone in which user data is lastly recorded, an address of a zone in which information on a subsequent drive and information on a subsequent state of the disc will be recorded or an address of a zone in which subsequent user data will be recorded may be recorded in the drive & disc zone 10d.

Where the information on the state of the disc having information on a latest state of the disc is not supplied, all information recorded in the OPC test zone 10b, the drive & disc zone 10d, or the user data area has to be reproduced when recording user data. Thus, it may take a great deal of time for the drive to access the disc.

Information on the number of sessions for determining how many sections the user data area is divided into may be recorded as the information on the state of the disc. For example, the information on the number of sessions can be supplied so as to divide the user data area into several sections according to their use purpose or capacity. As a result, the disc can be further conveniently used.

Where a recording of user data is completed, information for determining whether additional user data may be recordable is recorded immediately after a zone in which user data is lastly recorded. Data indicating that recording of additional user data is impossible after the recording of the user data is completed, can be recorded so that additional user data is not recorded. However, where recording of additional user data is possible, data indicating that additional user data can be recorded right after the zone in which user data is lastly recorded is recorded.

State address information included in the information on the state of the disc will now be described.

The state address information includes at least one of state information having information on a recording mode, the type of a file system, and information on a recording layer on which user data is recorded, a last recorded address of a zone in which user data is lastly recorded, and a last replaced address of an outer spare area in which data has been replaced to manage defects on the disc.

FIGS. 11A through 11D illustrate the state address information included in the information on the state of the disc. Referring to FIGS. 11A through 11D, information on an $n^{th}$ state of the disc or information on an $n^{th}$ drive and an $n^{th}$ state of the disc is recorded in a $0^{th}$ recording unit 10-$n$-0 of an $n^{th}$ physical cluster 10-$n$.

The state address information includes state information, a last recorded address of a zone in which user data is lastly recorded, and a last replaced address of an outer spare area in which data has been replaced to manage detects on the disc.

Figure 11A:
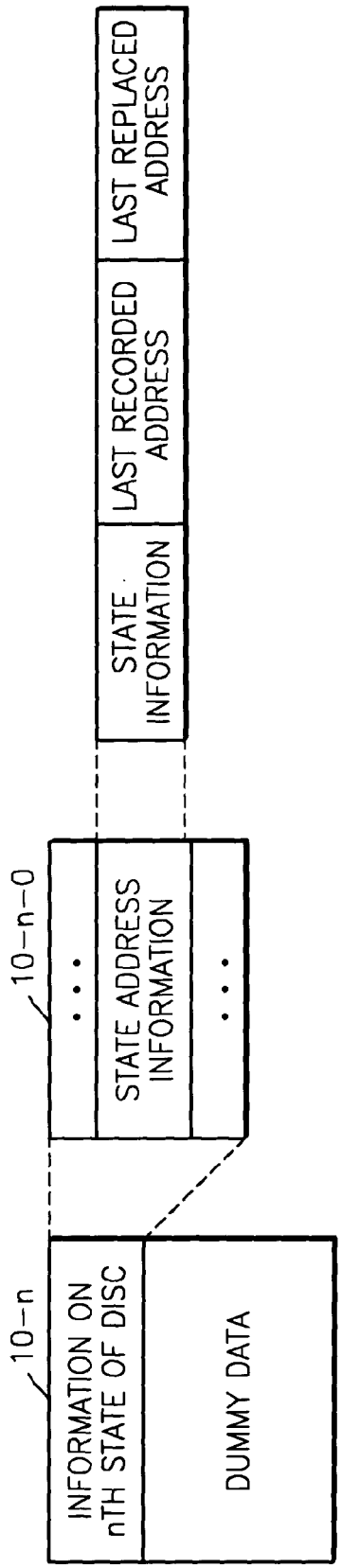
FIGS. 11A through 11D are views for explaining state address information recorded on an information storage medium according to the present invention.
Figure 11B:
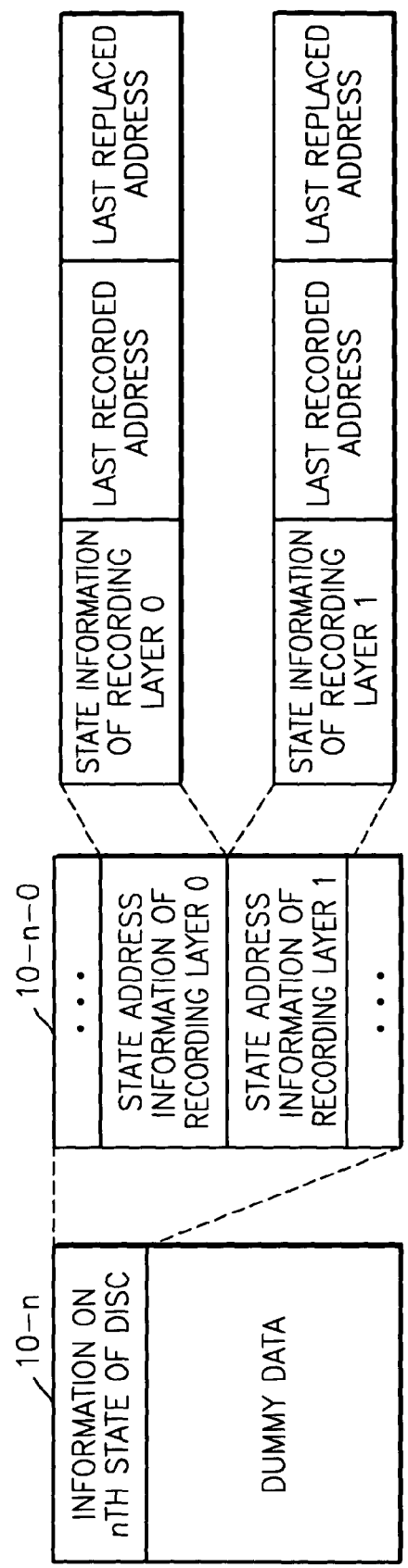
Figure 11C:
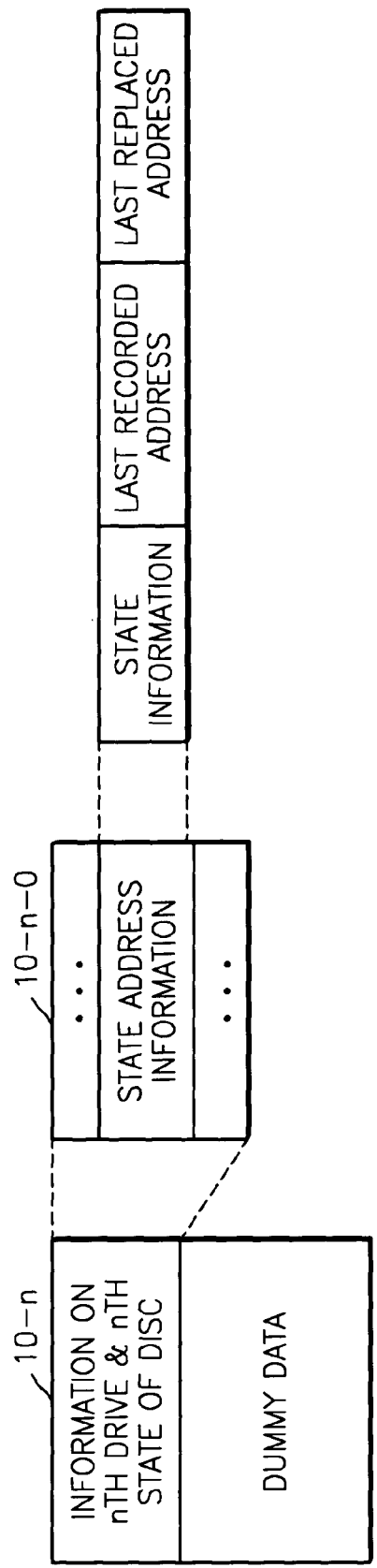
Figure 11D:
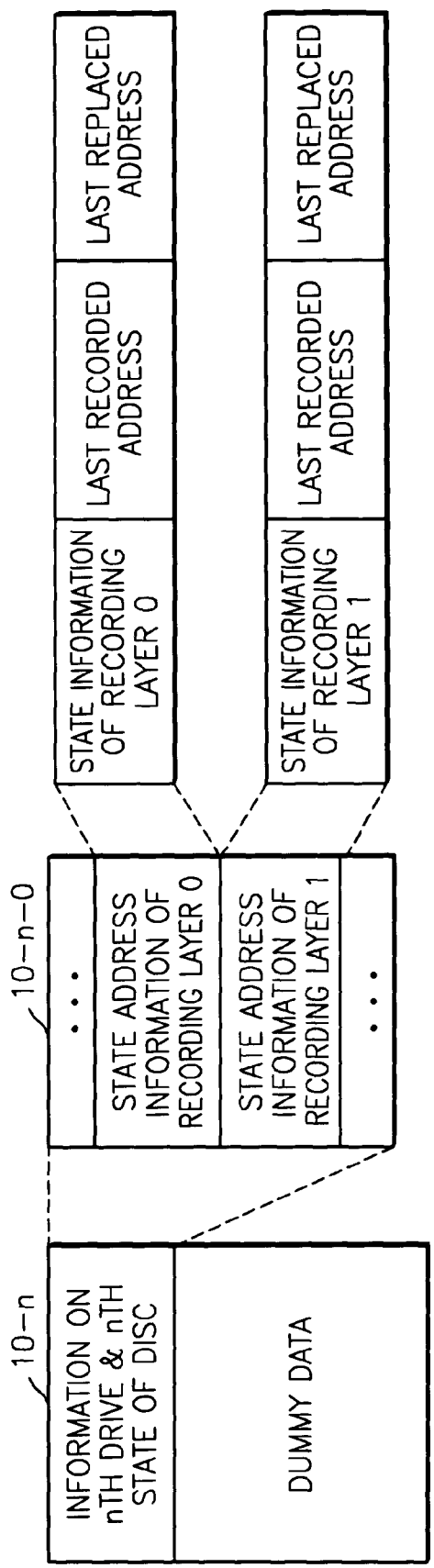

Each of FIGS. 11A and 11B illustrates state address information recorded on a single layer disc having one recording layer on which information on a state of the single layer disc is only recorded in one recording unit, and each of FIGS. 11C and 11D illustrates state address information on a dual layer disc having two recording layers on which information on a state of the dual layer disc and information on a drive are recorded in one recording unit.

The state information includes information on a recording mode, the type of a file system, and a recording layer.

The information on the recording mode indicates whether data has been recorded in a continuous recording mode or a random recording mode on the disc.

The information on the type of the file system indicates what type of file system the information storage medium, according to the present invention, uses to record data in file type, for example, recording data in a hard disc of a computer in file type.

The information on the recording layer indicates whether data has been recorded on a first recording layer (a recording layer 0) or a second recording layer (a recording layer 1). Only the recording layer 0 may exist in a single layer disc having one recording layer.

The last recorded address is an address of an ECC block in a user data area of each of recording layers in which data is recorded. Where an address is assigned to each of sectors, the address of the ECC block corresponds to an address of a first sector thereof.

The last replaced address of the outer spare area is an address of a last ECC block of an outer spare area in which data is recorded in order to manage detects. Where an address is assigned to each of the sectors, the address of the ECC block corresponds to an address of a first sector thereof.

Figure 12A:
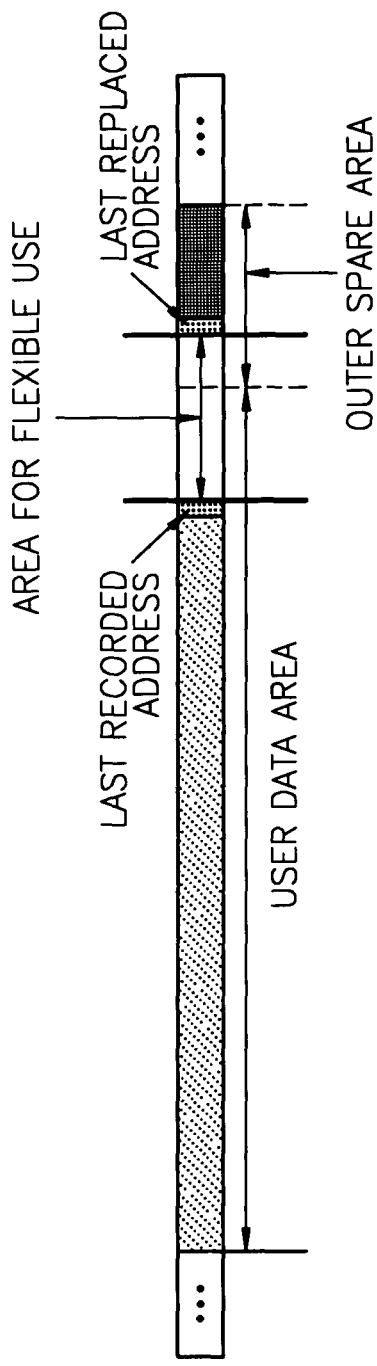
FIGS. 12A and 12B are views illustrating a last recorded address of a user data area and a last replaced address of an outer spare area for a defect management according to the present invention.
Figure 12B:
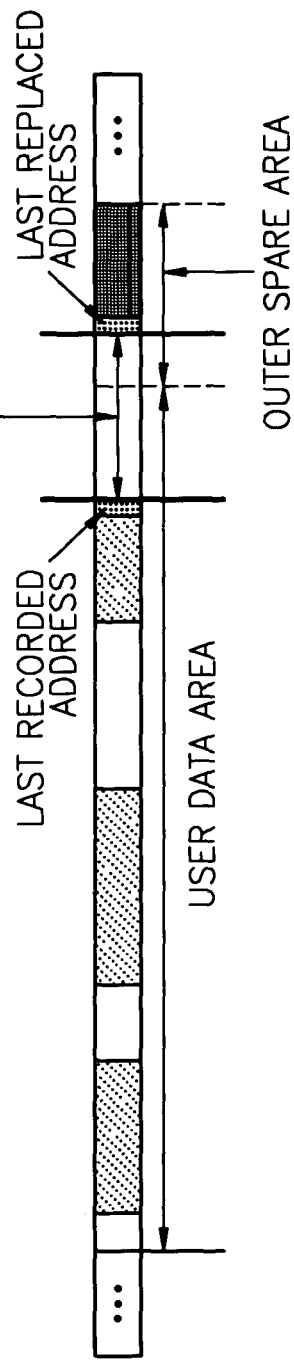

Each of FIGS. 12A and 12B illustrates the last recorded address and the last replaced address. In FIG. 12A, user data is recorded in a continuous recording mode in the user data area, and in FIG. 12B, user data is recorded in a random recording mode in the user data area.

A section in which recording of user data is possible can be rapidly found during subsequent recording of the user data by storing the last recorded address of the user data area in which the user data is recorded and the last replaced address of the outer spare area in which data is recorded, so as to manage the defects as the information on the state of the disc.

Where data is recorded in the outer spare area assigned to manage the defects, the data is recorded starting from a zone having a large address value toward a zone having a small address value, unlike a method of recording user data in the user data area.

Figure 13A:
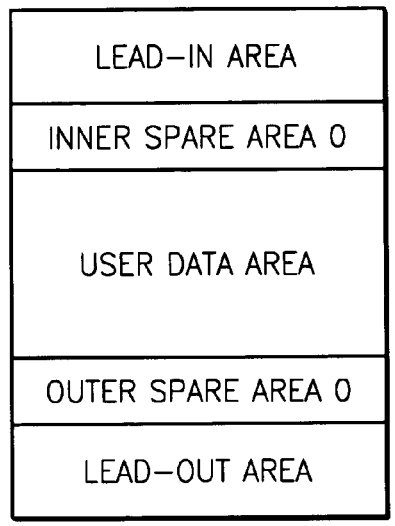
FIGS. 13A and 13B are views for explaining the outer spare area shown in FIGS. 12A and 12B.
Figure 13B:
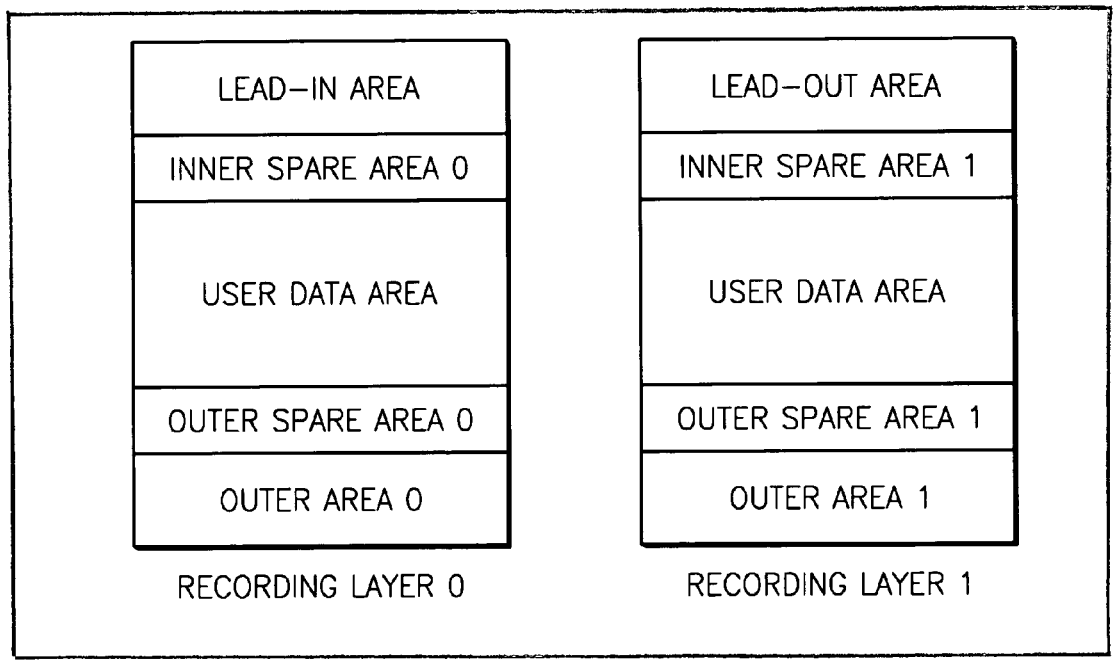

FIGS. 13A and 13B illustrate the outer spare area shown in FIGS. 12A and 12B.

FIG. 13A shows the outer spare area of a single layer disc and FIG. 13B shows the outer spare area of a dual layer disc. The outer spare area for managing the defects corresponds to an outer spare area 0 in the single layer disc shown in FIG. 13A and to an inner spare area 1 of a recording layer 1 in the dual layer disc shown in FIG. 13B.

Where data is recorded in the outer spare area 0 of the single layer disc shown in FIG. 13A, the data is recorded starting from outer tracks of the signal layer disc toward inner tracks. Where data is recorded in the inner spare area 1 of the recording layer 1 of the dual layer disc shown in FIG. 13B, the data is recorded starting from inner tracks of the dual layer disc toward outer tracks.

FIGS. 14A through 14D illustrate a format of the state address information.

Each of FIGS. 14A and 14B illustrates state address information formatted on a single layer disc and each of FIGS. 14C and 14D illustrates state address information formatted on a dual layer disc. In FIGS. 14A and 14C, state information is recorded as 8 bits at the beginning of a physical cluster, and in FIGS. 14B and 14D, state information is divided into state information 1 and 2, each of which is recorded as 4 bits.

Information on a state of the disc can be recorded in the drive & disc zone 10d of the recordable zone 10 of the lead-in or lead-out area whenever a recording of user data is finished. As a result, the pickup can accurately and rapidly access a corresponding zone using the information on the state of the disc when later recording the user data. Also, the user data can be efficiently recorded and/or reproduced. In particular, the information on the state of the disc is useful for a once-writable information storage medium.

As described above, according to the embodiment of FIG. 2, information on a drive and information on a state of a disc can be recorded together. Also, whenever this information is updated, the updated information can be recorded in a physical cluster or ECC block following a physical cluster or ECC block in which information on a previous drive and information on a previous state of the disc are recorded.

An information storage medium, for example, a disc, and a method of recording information thereon according to another embodiment of the present invention will be described with reference to FIG. 3.

In this embodiment, the drive & disc zone 10-d comprises a plurality of physical clusters or ECC blocks 10-1, 10-2, . . . , and 10-n, each of which includes a plurality of recording units 10-0-0, 10-0-1, . . . , and 10-0-m, for example, sectors or data frames. Here, information on a $0^{th}$ drive and information on a $0^{th}$ state of the disc are recorded in different physical clusters or ECC blocks. Thereafter, where a new drive records data on and/or reproduces data from the disc, information on the new drive and updated information on the state of the disc are also recorded in different physical clusters or ECC blocks. For example, the information on the new drive and the updated information on the state of the disc are recorded in physical clusters or ECC blocks following physical clusters or ECC blocks in which information on a previous drive and information on a previous state of the disc are recorded. Here, information on all used drives and information on all states of the disc is alternately recorded from a starting part of the drive & disc zone 10d. Hereinafter, only physical clusters will be described for convenience.

Figure 3:
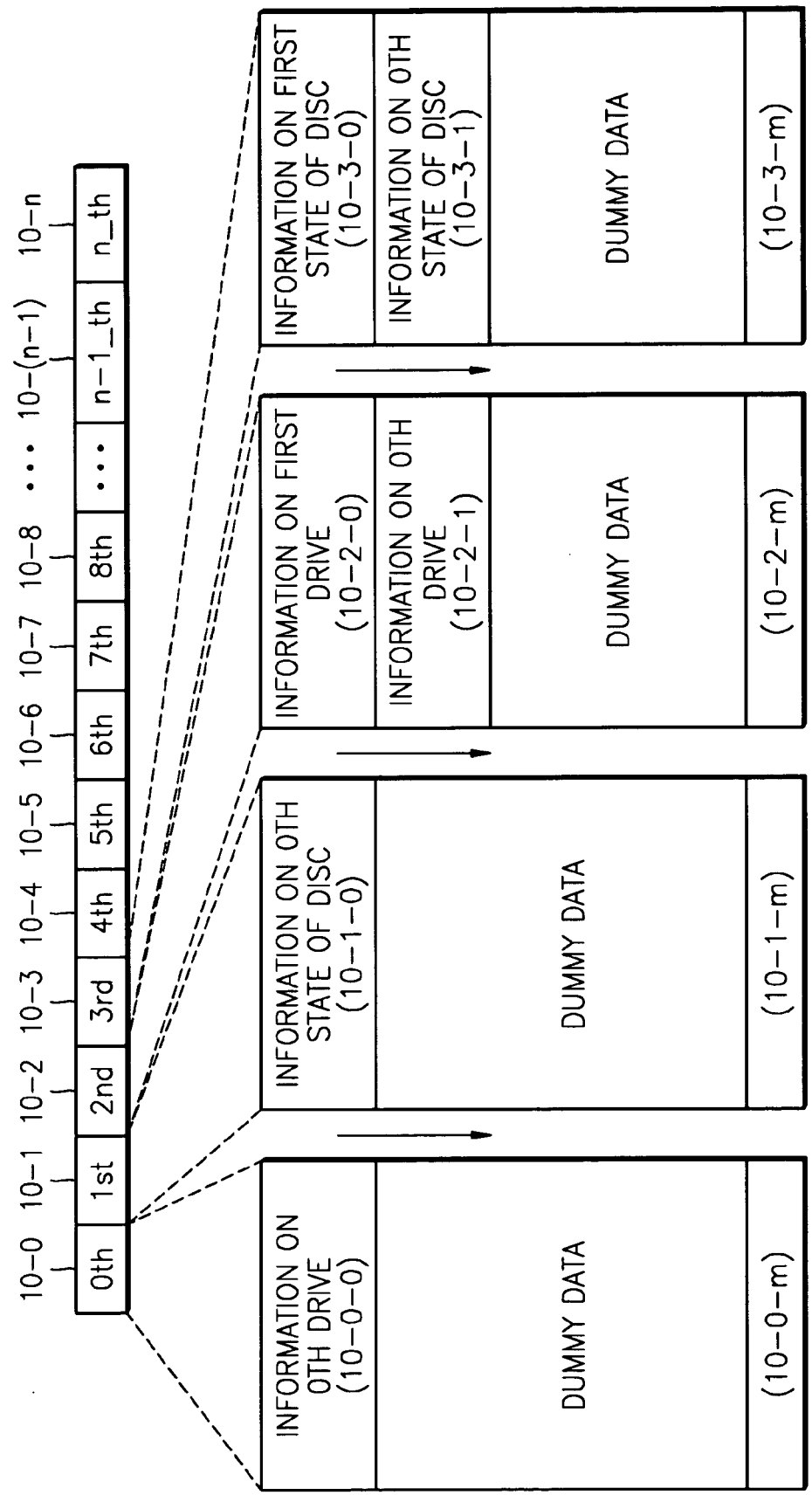
FIG. 3 is a view for explaining an information storage medium and a method of recording information thereon according to another embodiment of the present invention.

Referring to FIG. 3, information on the $0^{th}$ drive is recorded in the $0^{th}$ physical cluster 10-0 and information on the $0^{th}$ state of the disc is recorded in the first physical cluster 10-1. Where another drive, i.e., a first drive, records data on and/or reproduces data from the disc, information on the first drive and information on a first state of the disc are recorded in the second physical cluster 10-2 and the third physical cluster 10-3, respectively. Here, information on a new drive and information on a new state of the disc may be recorded in $0^{th}$ recording units of corresponding physical clusters, respectively, and information on previous drives and information on previous states of the disc may be copied starting from first recording units.

Where information on a drive and information on a state of a disc are recorded in different physical clusters as described above, at least one of an address of a zone in which information on a last drive is recorded and an address of a zone in which information on a last state of the disc is recorded can be recorded as the information on the state of the disc.

An information storage medium, for example, a disc, and a method of recording data thereon according to yet another embodiment of the present invention will be described with reference to FIG. 4A. The present embodiment is characterized in that information on a drive and information on a state of a disc are recorded in one of recording units of physical clusters or ECC blocks of the drive & disc zone 10d. In detail, information on a used drive, i.e., a $0^{th}$ drive, and information on a $0^{th}$ state of the disc are recorded in a $0^{th}$ recording unit 10-0-0 of a $0^{th}$ physical cluster 10-0. Thereafter, where another drive, i.e., a first drive, records data on and/or reproduces data from the disc, information on the first drive and information on a first state of the disc are recorded in a $0^{th}$ recording unit 10-1-0 of a first physical cluster 10-1 right after the $0^{th}$ physical cluster 10-0. The information on the $0^{th}$ drive and the information on the $0^{th}$ state of the disc are copied into a first recording unit 10-1-1 of the first physical cluster 10-1.

Where a second drive records data on and/or reproduces data from the disc, information on the second drive and information on a second state of the disc are recorded in a $0^{th}$ recording unit 10-2-0 of a second physical cluster 10-2. The information on the first drive and the first state of the disc and the $0^{th}$ drive, and the information on the $0^{th}$ drive and the $0^{th}$ state of the disc are copied into first and second recording units 10-2-1 and 10-2-2, respectively.

Figure 4B:
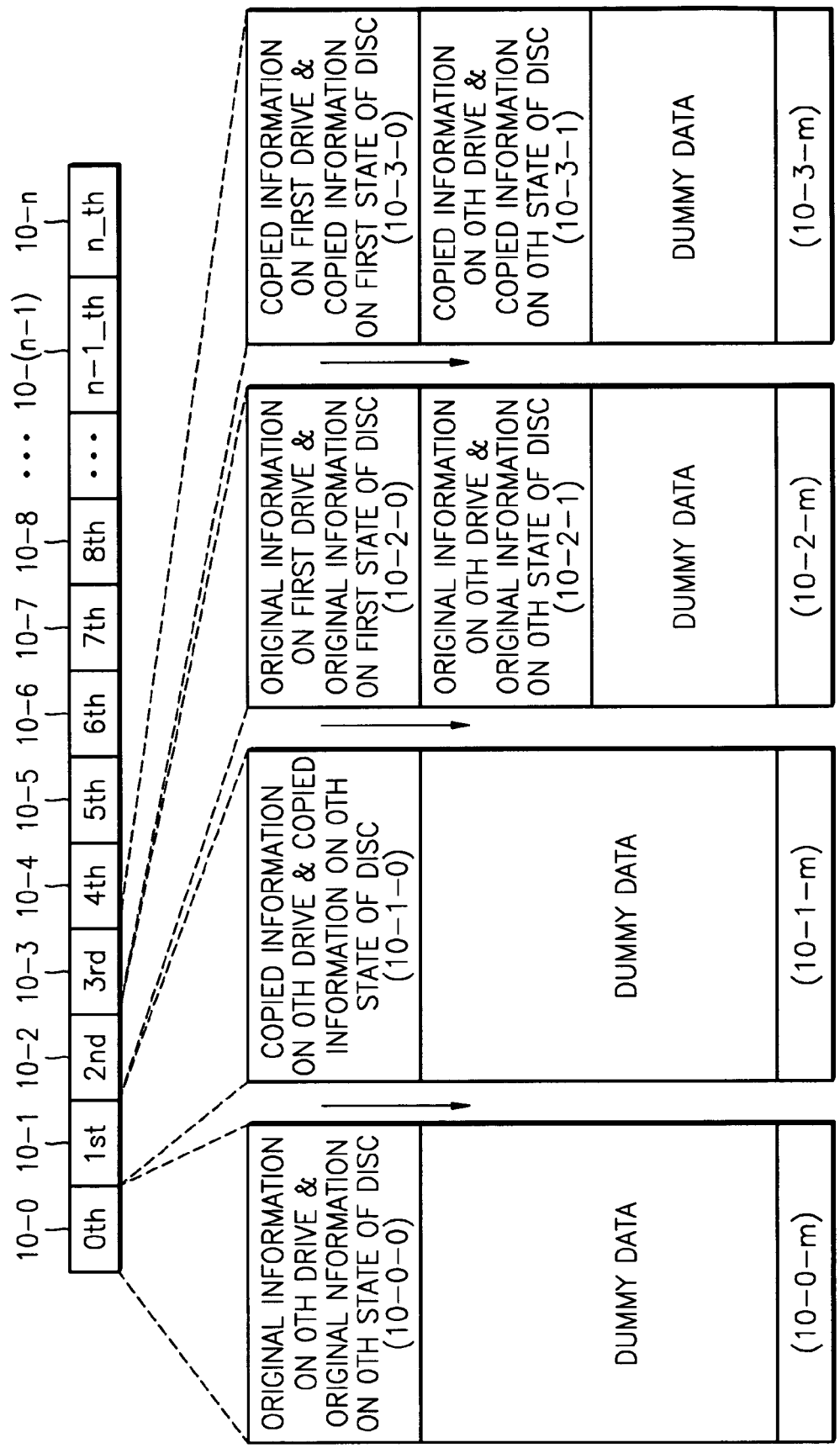

As shown in FIG. 4B, to increase the reliability of recording/reproducing of information on a drive and information on a state of a disc, original information on the drive and original information on the state of the disc may be recorded in a predetermined physical cluster, and then copied into another physical cluster. For example, original information on a $0^{th}$ drive and original information on a $0^{th}$ state of the disc are recorded in a $0^{th}$ recording unit 10-0-0 of a $0^{th}$ physical cluster 10-0, and then copied into a $0^{th}$ recording unit 10-1-0 of a first physical cluster 10-1.

Where another drive, i.e., a first drive, records data and/or reproduces data from the disc, original information on the first drive and original information on a first state of the disc are recorded in a second physical cluster 10-2 right after the first physical cluster 10-1 into which the original information on the $0^{th}$ drive and the original information on the $0^{th}$ state of the disc are copied, and then copied into a third physical cluster 10-3. In the present embodiment, original information on a drive and original information on a state of a disc are first recorded and then copied. It is understood that this aspect may be applied to the embodiments shown and described with respect to FIGS. 2 and 3. Therefore, where original information on a drive and original information on a state of a disc are damaged, or a defect appears, copied information on the drive and copied information on the state of the disc can be reproduced. As a result, an efficiency of recording and/or reproducing data can be improved.

Figure 5:
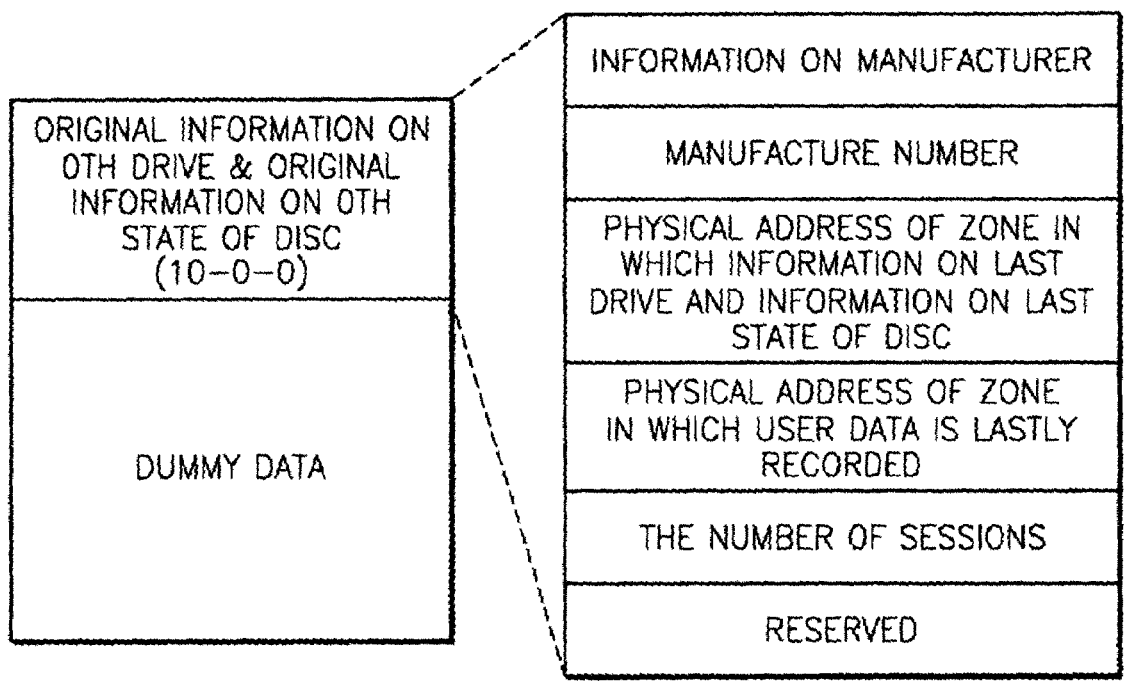
FIG. 5 is a view illustrating information on a drive and on a state of a storage medium, the information being recorded in a drive & disc zone of an information storage medium according to the present invention.

FIG. 5 shows an example of information on a drive and information on a state of a disc recorded in a recording unit according to the embodiment of FIG. 4A.

Figure 6B:
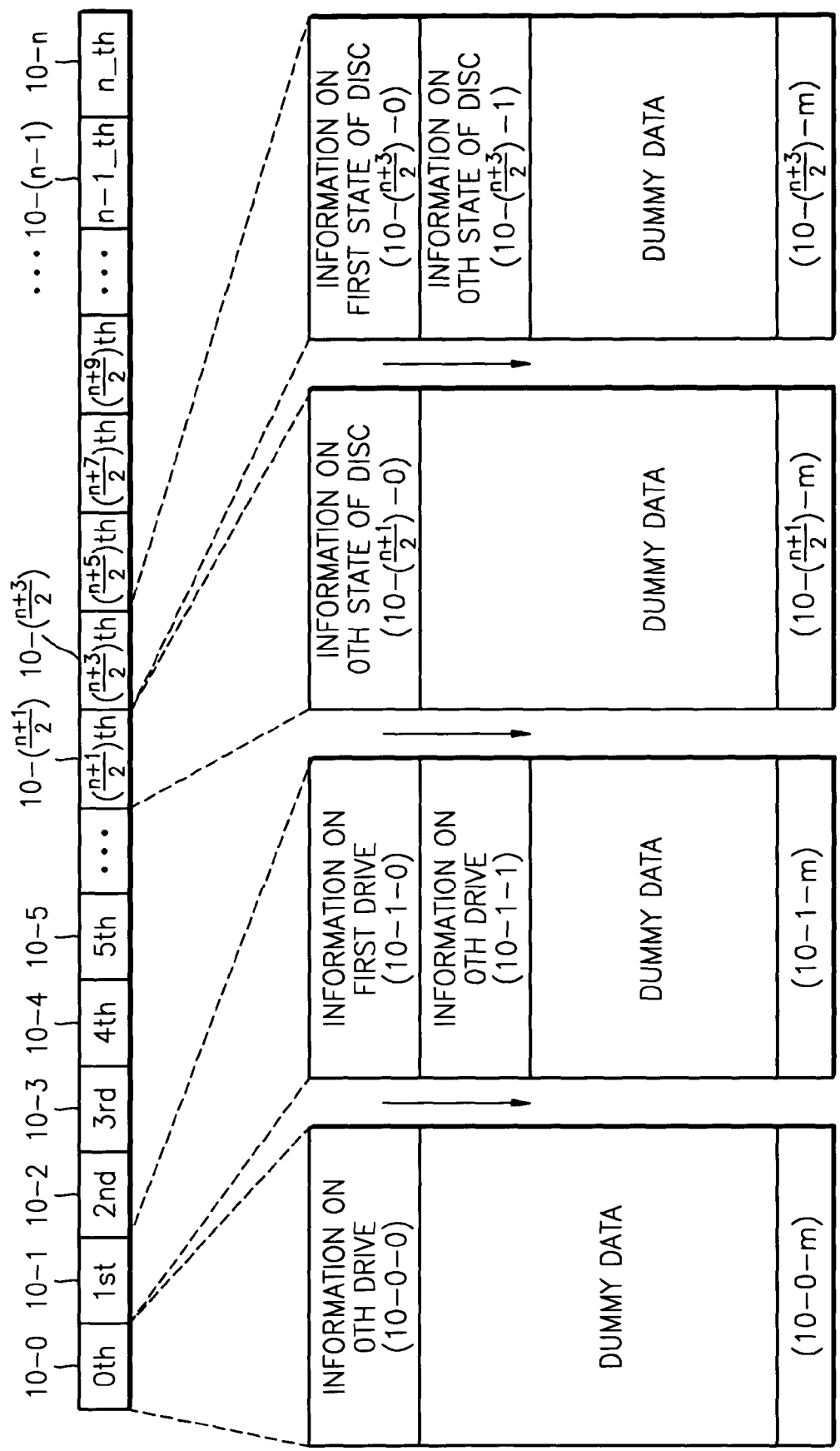

An information storage medium, for example, a disc, and a method of recording data thereon according to still another embodiment of the present invention will be described with reference to FIGS. 6A and 6B. Referring to FIGS. 6A and 6B, a drive & disc zone 10d of a recordable zone 10 of a lead-in or lead-out area, except a user data area, is divided into two zones. Information on a drive is recorded in a front zone and information on a state of a disc is recorded in a back zone. The drive & disc zone 10d shown in FIG. 6A is the same as that shown in FIG. 1 except that the drive & disc zone 10d is divided into two zones, and thus will not be explained herein.

As shown in FIG. 6B, the drive & disc zone 10d comprises, for example, (n+1) physical clusters or ECC blocks. Information on the drive is recorded in a front half of the drive & disc zone 10d and information on the state of the disc is recorded in a back half of the drive & disc zone 10d. In other words, whenever information on a new drive is recorded, the information is sequentially recorded starting from a $0^{th}$ physical cluster 10-0 to a $(n-1)/2^{th}$ physical cluster 10-(n−1)/2. Whenever information on the state of the disc is updated, the updated information is sequentially recorded starting from a $(n+1)/2^{th}$ physical cluster 10-(n+1)/2 to an $n^{th}$ physical cluster 10-n.

In more detail, information on a $0^{th}$ drive is recorded in a $0^{th}$ recording unit 10-0-0 of a $0^{th}$ physical cluster 10-0, and information on a $0^{th}$ state of the disc is recorded in a $0^{th}$ recording unit 10-(n+1)/2 of a $(n+1)/2^{th}$ physical cluster 10-(n+1)/2. Where a new drive, i.e., a first drive, records data on and/or reproduces data from the disc, information on the first drive is recorded in a $0^{th}$ recording unit 10-1-0 of a first physical cluster 10-1. Here, the information on the $0^{th}$ drive may be copied into a first recording unit 10-1-1 of the first physical cluster 10-1, as shown in FIG. 6B. Information on a first state of the disc is recorded in a $0^{th}$ recording unit 10-(n+3)2-0 of a $(n+3)/2^{th}$ physical cluster 10-(n+3)/2, and the information on the $0^{th}$ state of the disc may be copied into a first recording unit 10-(n+3)2-1 of the $(n+3)/2^{th}$ physical cluster 10-(n+3)/2.

In the above-described embodiments, while information on a drive is recorded prior to information on a state of a disc, it is understood that the information on the state of the disc may be recorded prior to the information on the drive.

Figure 7A:
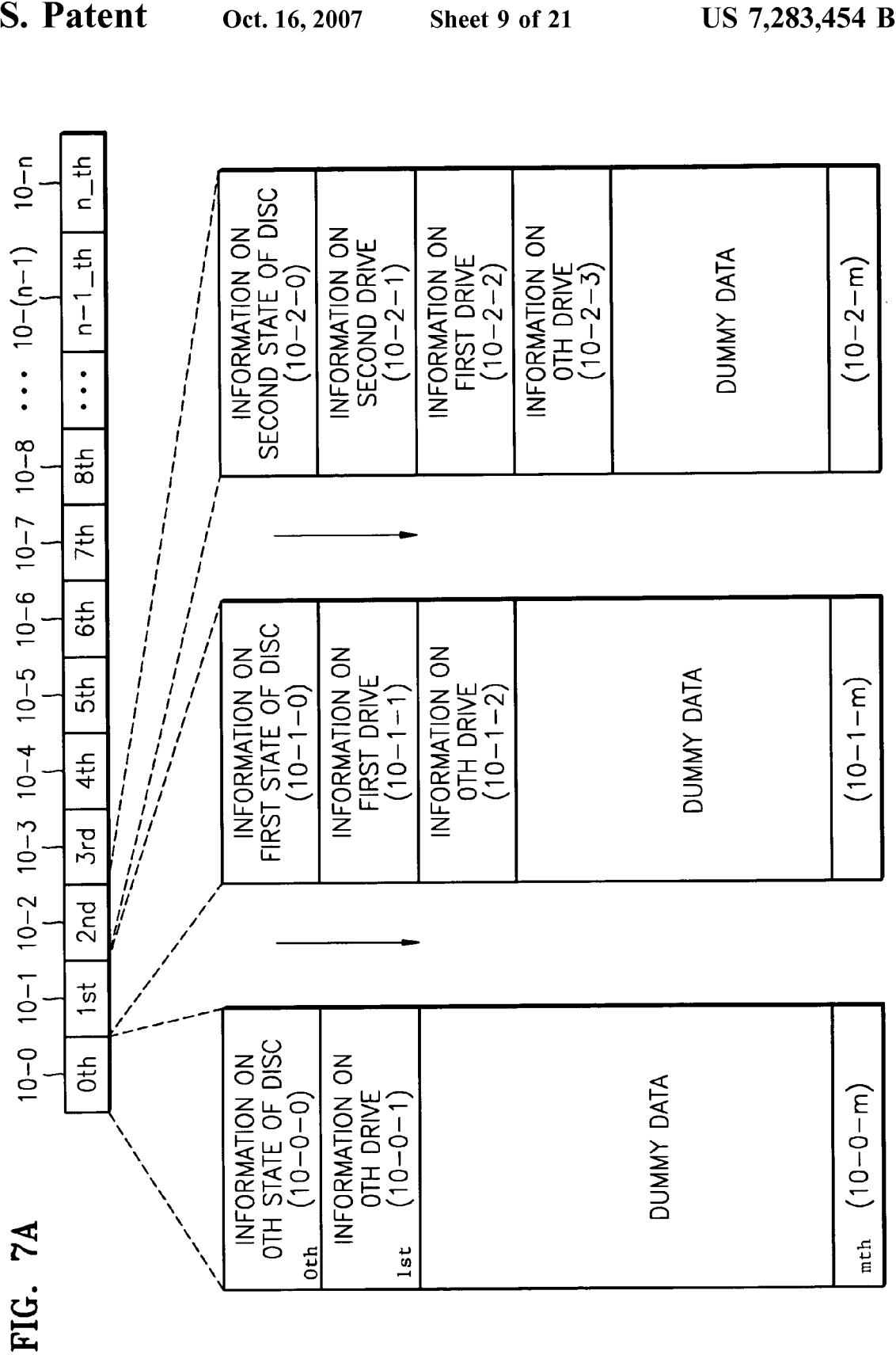
FIGS. 7A and 7B are views for explaining an information storage medium and a method of recording information thereon according to still yet another embodiment of the present invention.

FIG. 7A shows an information storage medium, for example, a disc, and a method of recording data thereon according to still yet another embodiment of the present invention. A drive & disc zone 10d thereof includes (n+1) physical clusters or ECC blocks ranging from a $0^{th}$ physical cluster or ECC block 10-0 to a $n^{th}$ physical cluster or ECC block 10-n. The $0^{th}$ physical cluster or ECC block 10-0 comprises (m+1) recording units ranging from a $0^{th}$ recording unit 10-0-0 to an $m^{th}$ recording unit.

A method of recording data on the information storage medium according to this embodiment is characterized in that where information on a drive and information on a state of a disc are updated, information on a previous state of the disc is not recorded. However, information on a new drive is recorded and information on a previous drive is copied. Thus, where information on the drive and information on the state of the disc is updated, the updated information may be recorded in another positions.

For example, as shown in FIG. 7A, information on the state of the disc may be recorded in a starting recording unit of a physical cluster or ECC block and information on the drive may be recorded in a recording unit right after the starting recording unit. In detail, information on a $0^{th}$ state of the disc is recorded in a $0^{th}$ recording unit 10-0-0 of a $0^{th}$ physical cluster 10-0 and information on a $0^{th}$ drive is recorded in a first recording unit 10-0-1 of the $0^{th}$ physical cluster 10-0. Dummy data is recorded in remaining recording units of the $0^{th}$ physical cluster 10-0. Where a new drive records data on and/or reproduces data from the disc, information on a new state of the disc, i.e., a first state of the disc, is recorded in a $0^{th}$ recording unit 10-1-0 of a first physical cluster 10-1. Information on the new drive, i.e., a first drive, is recorded in a first recording unit 10-1-1 of the first physical cluster 10-1. The information on the $0^{th}$ drive is copied into a second recording unit 10-1-2 of the first physical cluster 10-1.

Where information on a second state of the disc and information on a second drive are recorded in a second physical cluster 10-2, the information in the second state of the disc is recorded in a $0^{th}$ recording unit 10-2-0 of the second physical cluster 10-2 and the information on the first and $0^{th}$ states of the disc is not recorded. The information on the second drive is recorded in a first recording unit 10-2-1 and the information on the first drive and the information on the $0^{th}$ drive are copied into a second recording unit 10-2-2 and a third recording unit 10-2-3, respectively.

In the embodiment of FIG. 7A, only updated information on the state of a disc is recorded, but information on previous states of the disc is not recorded. As for information on used drives, information on a new drive is recorded and information on previous drives is copied.

The information on the state of the disc, for example, may be at least one of an address of a zone in which new OPC data is recorded, an address of a zone in which information on a last drive or information on a last state of a disc is recorded, a last recorded address of a zone of a user data area in which user data is lastly recorded, write protection information, information on the number of sessions, information necessary for determining whether additional user data is recordable, an address of a zone in which information on a subsequent drive or information on a subsequent state of the disc is to be recorded, and an address of a zone in which subsequent user data is to be recorded. Where one of these addresses is changed into a new one, information on the previous address may be unnecessary. Thus, only updated information on the state of the disc may be recorded.

In an event that information on a new drive contains pieces of information similar or equal to pieces of information on a previous drive, the new drive can be easily set up using the pieces of information on the previous drive. Therefore, since the information on the previous drive may be used, information on a new drive is recorded along with information on a previous drive.

Figure 7B:
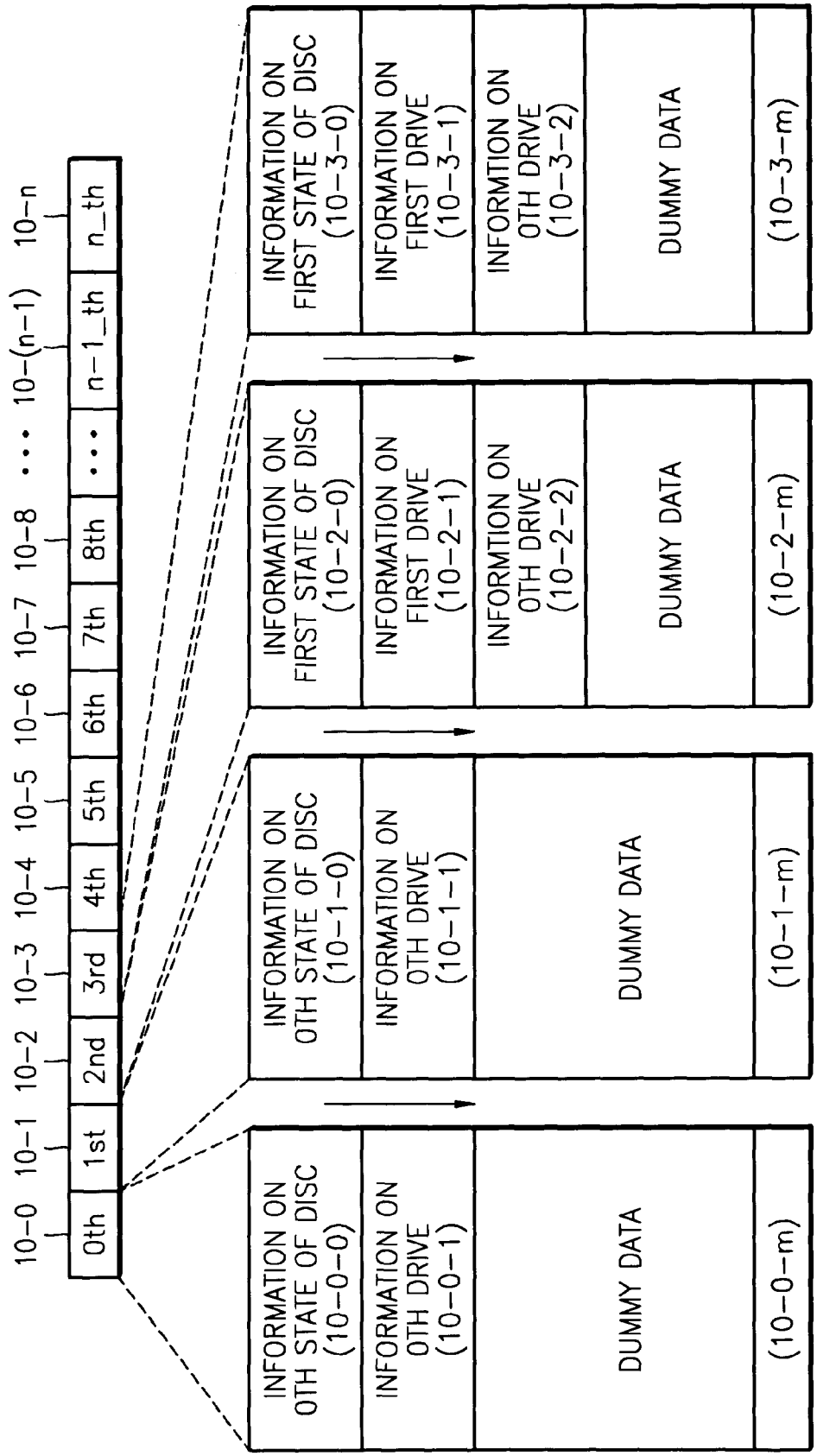

As shown in FIG. 7B, to increase the reliability of information on a state of a disc and information on a drive, the information on the state of the disc and the information on the drive can be copied from a physical cluster to another. For example, information on a $0^{th}$ state of the disc and information on a $0^{th}$ drive are recorded in a $0^{th}$ physical cluster 10-0, and copied into a first physical cluster 10-1. Information on a first state of the disc is recorded in a $0^{th}$ recording unit 10-2-0 of a second physical cluster 10-2, information on a first drive is recorded in a first recording unit 10-2-1 of the second physical cluster 10-2, and the information on the $0^{th}$ drive is copied into a second recording unit 10-2-2 of the second physical cluster 10-2, and copied into a third physical cluster 10-3.

Figure 8A:
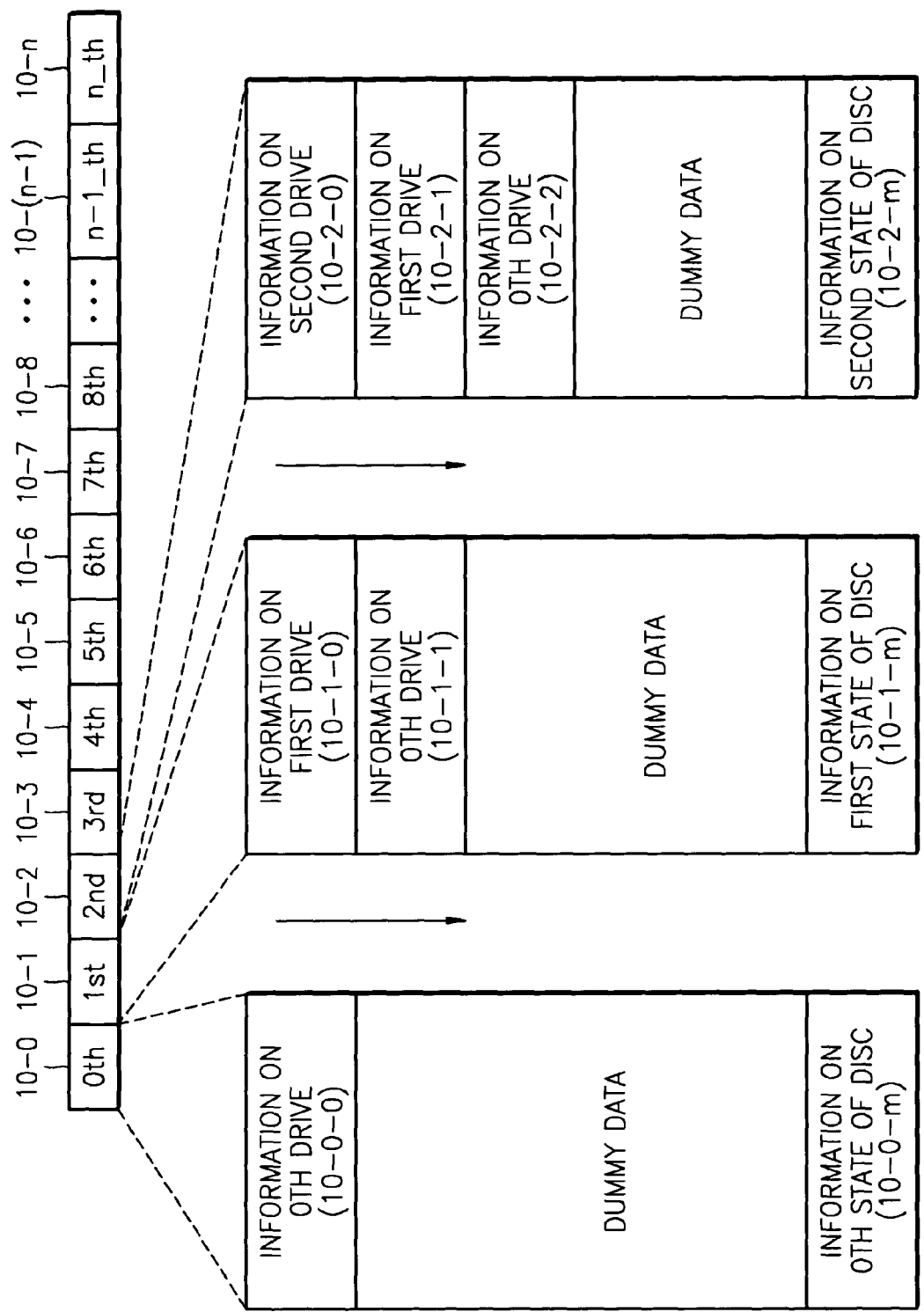
FIGS. 8A, 8B, and 9 are views for explaining aspects of the embodiment shown in FIGS. 7A and 7B.

According to an aspect of the present invention, as shown in FIG. 8A, information on a new drive is recorded in a starting recording unit of a predetermined physical cluster and information on a previous drive is copied into a recording unit right after the starting recording unit. Information on a new state of a disc is recorded in a last recording unit of the predetermined physical section.

In detail, information on a $0^{th}$ drive is recorded in a $0^{th}$ recording unit 10-0-0 of a $0^{th}$ physical cluster 10-0 and information on a $0^{th}$ state of the disc is recorded in an $m^{th}$ recording unit 10-O-m of the $0^{th}$ physical cluster. Information on a first drive is recorded in a $0^{th}$ recording unit 10-1-0 of a first physical cluster 10-1 and the information on the $0^{th}$ drive is copied into a first recording unit 10-1-1 of the first physical cluster 10-1. Information on a first state of the disc is recorded in an $m^{th}$ recording unit 10-1-$m$ of the first physical cluster 10-1. Every time information on the drive and information on the state of the disc are updated, recording is performed according to this method.

This method has an advantage in that a position in which information on the state of the disc is updated is determined as a last recording section.

Figure 8B:
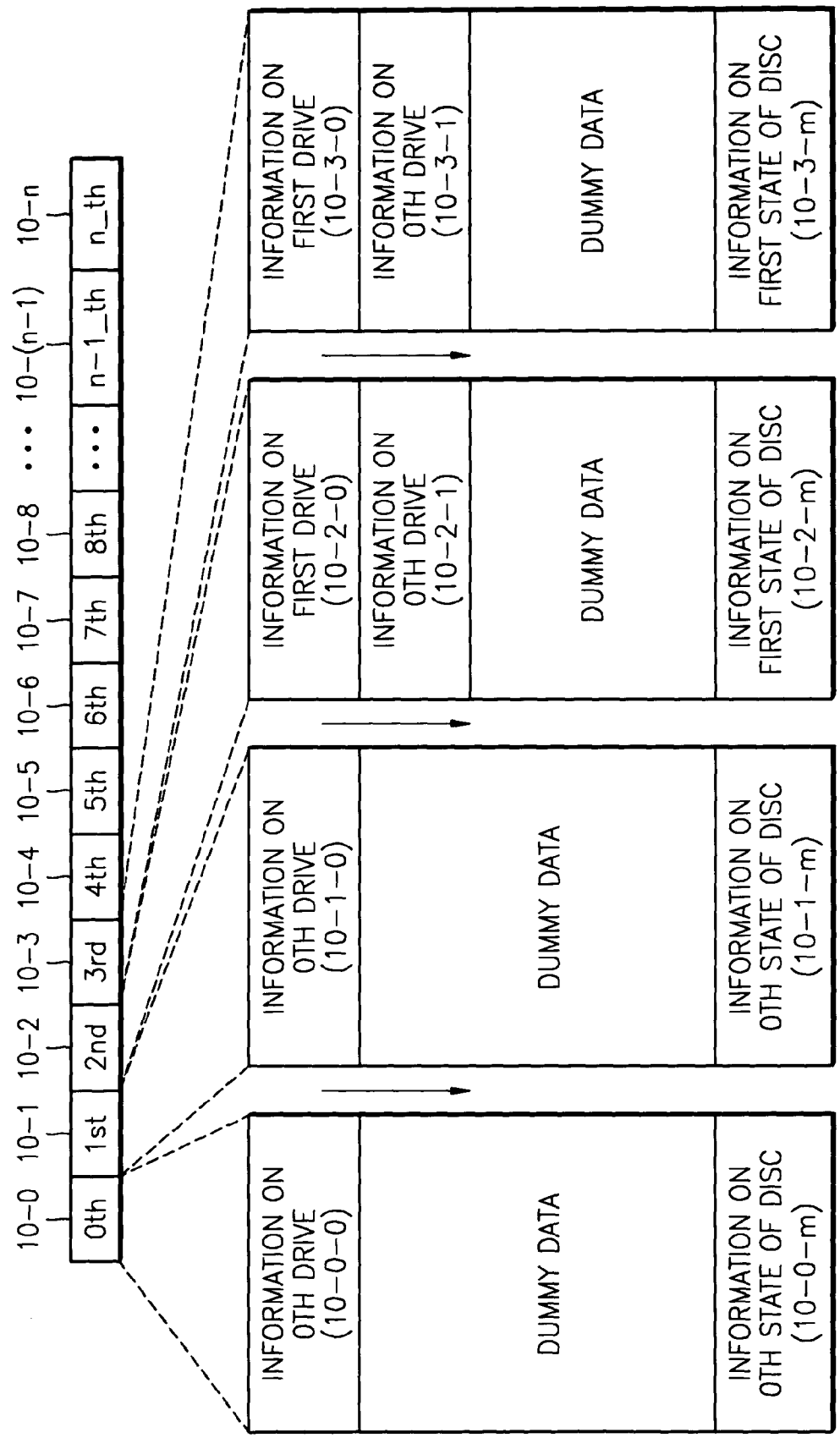

As shown in FIG. 8B, to increase the reliability of information on a state of a disc and information on a drive, the information on the state of the disc and the information on the drive can be copied from a physical cluster to another.

Figure 9:
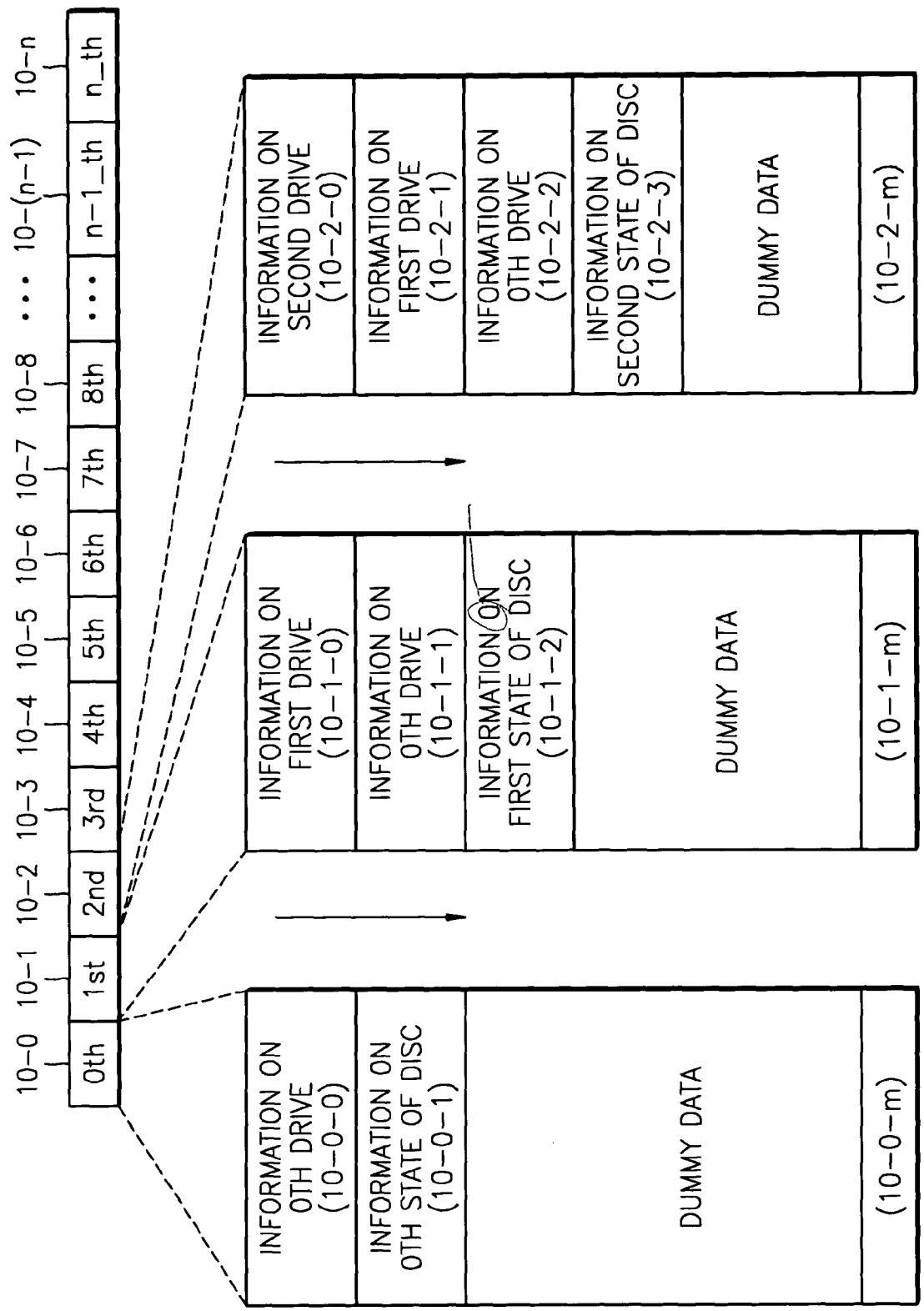

According to another aspect of the present invention, as shown in FIG. 9, information on a drive is first recorded, and updated information on a state of a disc is then recorded in a recording unit right after a recording unit in which information on the drive is lastly recorded.

For example, information on a $0^{th}$ drive is recorded in a $0^{th}$ recording unit 10-0-0 of a $0^{th}$ physical cluster 10-0 and information on a $0^{th}$ state of the disc is recorded in a first recording unit 10-0-1 of the $0^{th}$ physical cluster 10-0. Information on a first drive is recorded in a $0^{th}$ recording unit 10-1-0 of a first physical cluster 10-1 and the information on the $0^{th}$ drive is copied into a first recording unit 10-1-1 of the first physical cluster 10-1. Information on a first state of the disc is recorded in a second recording unit 10-1-2 of the first physical cluster 10-1.

In other words, in this example, information on a new drive is recorded in a starting recording unit of a predetermined physical cluster, information on a previous drive is copied into a recording unit right after the starting recording unit, and information on a new state of a disc is recorded in a recording unit right after the recording unit into which the information on the previous drive is copied.

According to the examples described with reference to FIG. 9, where information on a new drive and information on a new state of a disc are recorded, information on a previous drive and information on a previous state of the disc can be copied into a physical cluster following a physical cluster in which the information on the previous drive and the information on the previous state of the disc are recorded, so as to increase the reliability of information.

The recording units may be sectors or data frames, and in particular, updated information on the state of the disc may be regarded as being recorded in one recording unit.

An information storage medium, for example, a disc, and a method of recording data thereon according to a still further embodiment of the present invention will be described with reference to FIG. 10A. In this embodiment, information on a state of a disc is recorded whenever it is updated, and information on a drive is selectively recorded according to the standards of a used drive.

For example, $0^{th}$ and first drives are standardized so as not to record information about themselves, and second and third drives are standardized so as to record information about themselves. Thus, where the $0^{th}$ drive records information on and/or reproduce information from the disc, information on a $0^{th}$ state of the disc is recorded in a $0^{th}$ recording unit 10-0-0 of a $0^{th}$ physical cluster 10-0 and information on the $0^{th}$ drive is not recorded. Where the first drive records information on and/or reproduces from the disc, information on a first state of the disc is recorded in a $0^{th}$ recording unit 10-1-0 of a first physical cluster 10-1 and information on the first drive is not recorded.

Where the second drive records information on and/or reproduces information from the disc, information on a second state of the disc is recorded in a $0^{th}$ recording unit 10-2-0 of a second physical cluster 10-2 and the information on the $0^{th}$ drive is recorded in a first recording unit 10-2-1 of the second physical cluster 10-2. Where the third drive records information on and/or reproduces from the disc, information on a third state of the disc is recorded in a $0^{th}$ recording unit 10-3-0 of a third physical cluster 10-3. Here, the information on the first drive is recorded in a first recording unit 10-3-1 of the third physical cluster 10-3, and the information on the $0^{th}$ drive is copied into a second recording unit 10-3-2 of the third physical cluster 10-3.

That is, recording of updated information on the state of the disc is mandatory and recording of information on a new drive is optional according to its standards. Also, where a used drive is standardized as not to record information about itself, the information on the used drive is not recorded, but previously recorded information on a previous drive is copied.

Figure 10A:
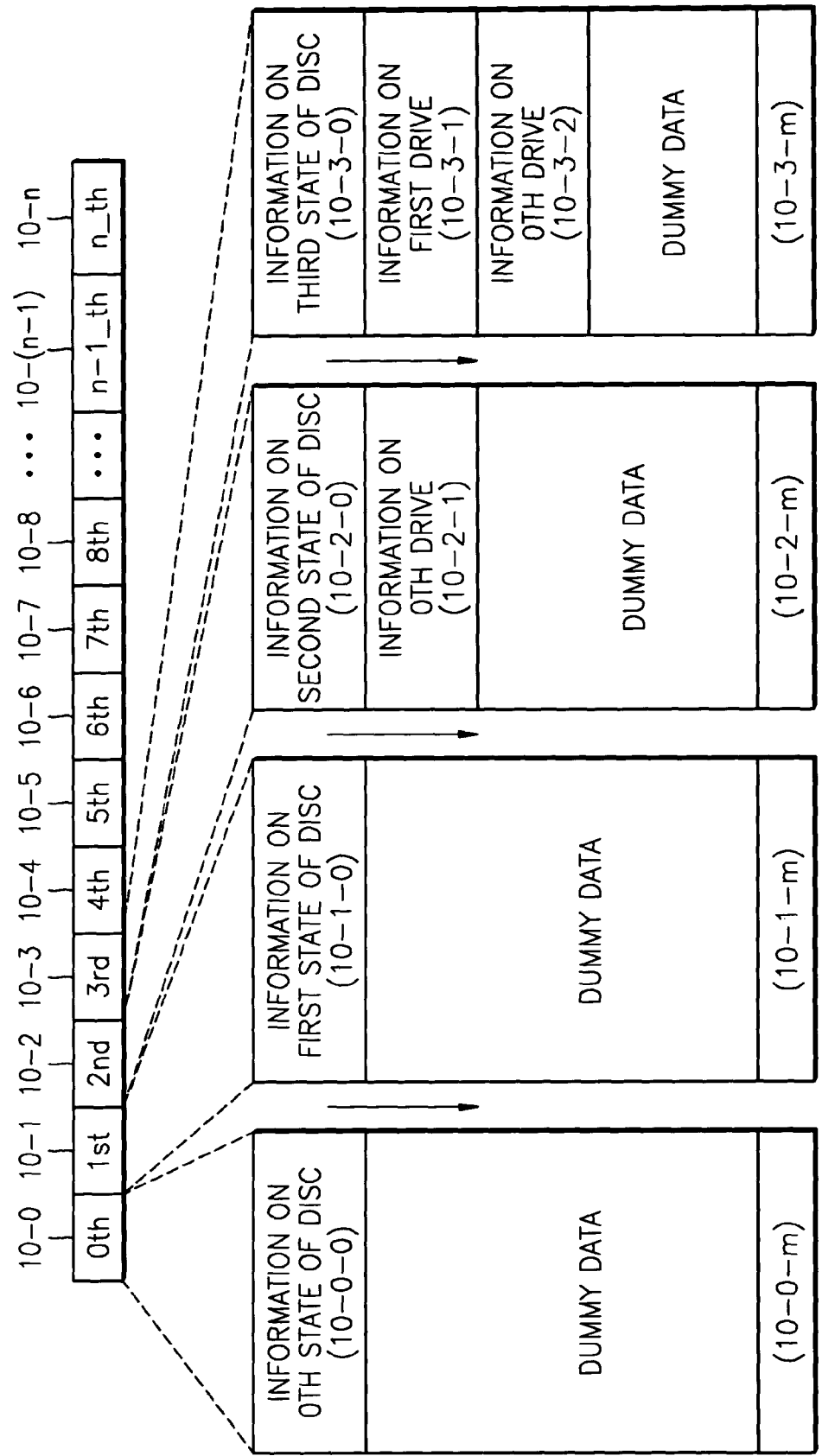
FIGS. 10A through 10C are views for explaining examples of an information storage medium and a method of recording information thereon according to a still further embodiment of the present invention.
Figure 10B:
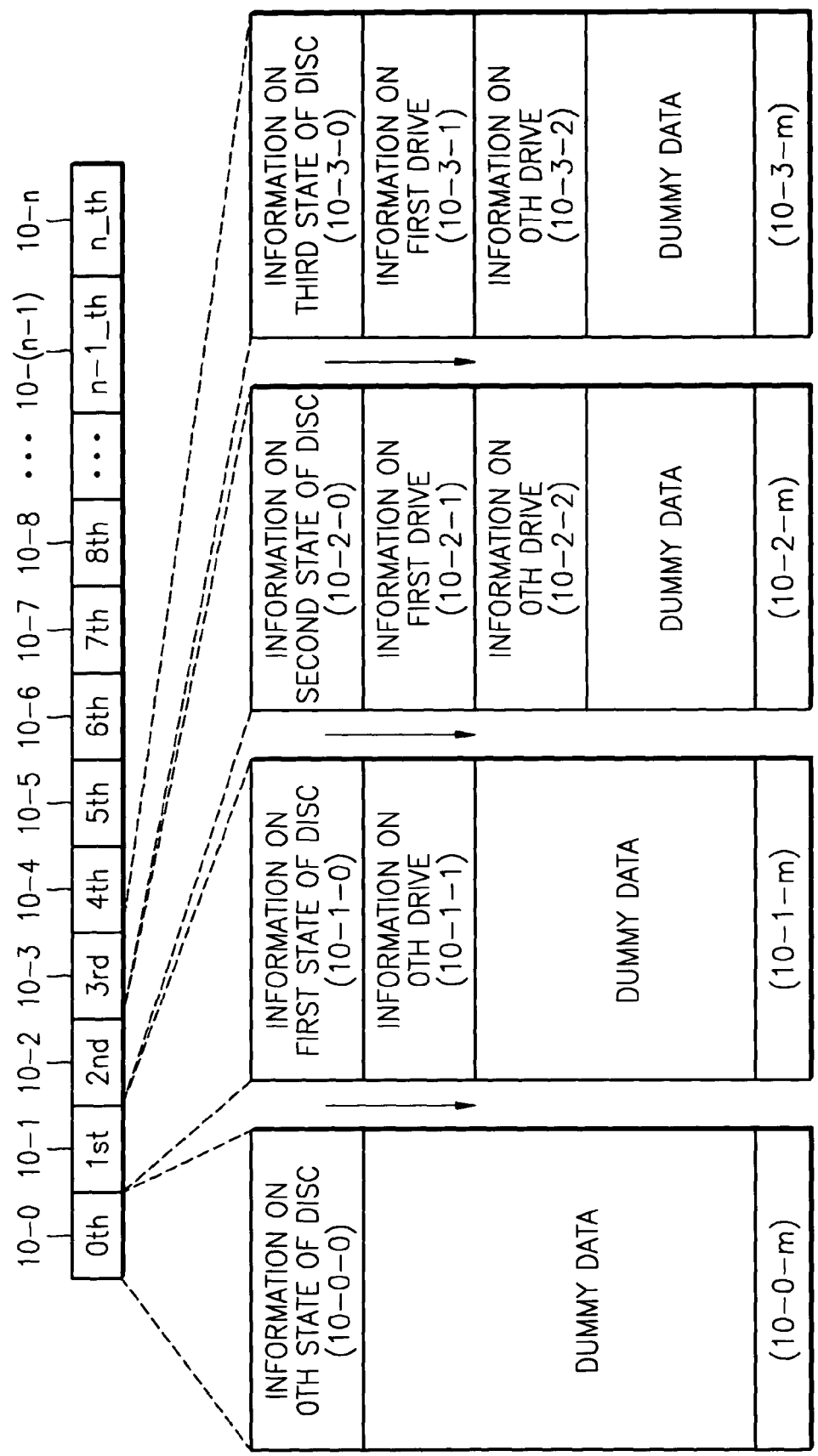

In another example of the embodiment shown in FIG. 10A, as shown in FIG. 10B, a $0^{th}$ drive is standardized so as not to record information about itself, first and second drives are standardized so as to record information about themselves, and a third drive is standardized so as not to record information about itself.

Therefore, where the $0^{th}$ drive records information on and/or reproduces information from a disc, information on a $0^{th}$ state of the disc is recorded in a $0^{th}$ recording unit 10-0-0 of a $0^{th}$ physical cluster 10-0 and information on the $0^{th}$ drive is not recorded. Where the first drive records information on and/or reproduces information from the disc, information on a first state of the disc is recorded in a $0^{th}$ recording unit 10-1-0 of a first physical cluster 10-1 and the information on the $0^{th}$ drive is recorded in a first recording unit 10-1-1 of the first physical cluster 10-1. Where the second drive records information on and/or reproduces information from the disc, information on a second state of the disc is recorded in a $0^{th}$ recording unit 10-2-0 of a second physical cluster 10-2 and information on the first drive is recorded in a first recording unit 10-2-1 of the second physical cluster 10-2. The information on the $0^{th}$ drive is copied into a second recording unit 10-2-2 of the second physical cluster 10-2.

Where the third drive records information on and/or reproduces information from the disc, information on a third state of the disc is recorded in a $0^{th}$ recording unit 10-3-0 of a third physical cluster 10-3 and information on the third drive is not recorded. The information on the first drive and the information on the $0^{th}$ drive are copied into a first recording unit 10-3-1 and a second recording unit 10-3-2 of the third physical cluster 10-3, respectively.

Figure 10C:
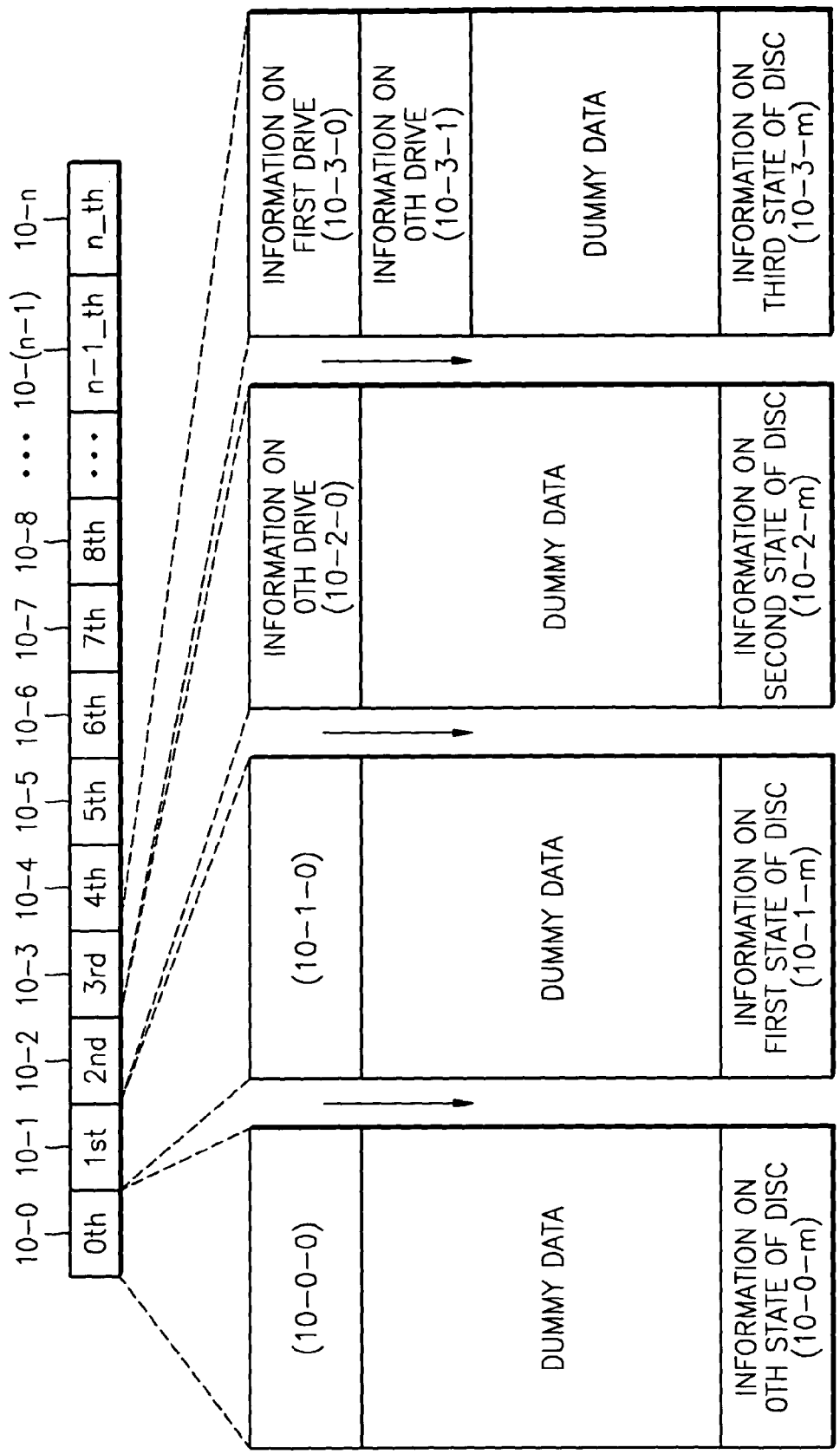

In the above-described example, updated information on a state of a disc is recorded in a $0^{th}$ recording unit of a predetermined physical cluster and information on a drive is recorded in a recording unit following the $0^{th}$ recording unit. However, the updated information on the state of the disc may be recorded in a last recording unit of the predetermined physical cluster. For example, assuming that $0^{th}$ and first drives are standardized so as not to record information about themselves, and second and third drives are standardized so as to record information about themselves, as shown in FIG. 10C, information on a $0^{th}$ state of the disc is recorded in an $m^{th}$ recording unit 10-O-m of a $0^{th}$ physical cluster 10-0, and information on a first state of the disc is recorded in an $m^{th}$ recording unit 10-1-$m$ of a first physical cluster 10-1. Here, information on used drives is not recorded.

Information on a $0^{th}$ drive is recorded in a $0^{th}$ recording unit 10-2-0 of a second physical cluster 10-2 and information on a second state of the disc is recorded in an $m^{th}$ recording unit 10-2-$m$ of the second physical cluster 10-2. Information on a first drive is recorded in a $0^{th}$ recording unit 10-3-0 of a third physical cluster 10-3, the information on the $0^{th}$ drive is copied into a first recording unit 10-3-1 of the third physical cluster 10-3, and information on a third state of the disc is recorded in an $m^{th}$ recording unit 10-3-$m$ of the third physical cluster 10-3.

That is, a recording of updated information on a state of a disc in a last recording unit of each of physical clusters is mandatory and a recording of information on used drives in a starting recording unit of each of the physical clusters is optional according to its standards. Also, information on previous drives can be copied.

The reliability of information can be secured by copying information on a previous state of a disc and information on a previous drive into a next physical cluster using the method according to the above embodiment.

As described above, in a method of recording information on an information storage medium, for example, a disc, according to the present invention, information on drives and information on states of a disc are recorded in a drive & disc zone 10$d$ of a recordable zone of a lead-in or lead-out area, except a user data area. The drive & disc zone 10$d$ comprises a plurality of physical clusters or ECC blocks. Where information on a new drive and information on a new state of the disc are recorded, the information on the new drive and the information on the new state of the disc are recorded in a physical cluster or ECC block different from a physical cluster or ECC block in which information on a previous drive and information on a previous state of the disc are recorded.

Information on a used drive and information on a state of a disc may be recorded in a physical cluster or ECC block or different physical clusters or ECC blocks. In addition, each of the plurality of physical clusters or ECC blocks may comprise a plurality of recording units, for example, sectors or data frames. In a case where information on a used drive and information on a state of a disc are recorded in a physical cluster, the information on the used drive and the information on the state of the disc may be recorded in different recording units of the physical cluster as described with reference to FIG. 2 or in a recording unit of the physical cluster as described with reference to FIG. 4A.

In an event that information on used drives and information on the states of a disc are recorded in different physical clusters or ECC blocks, as described with reference to FIG. 3, the information on the used drives and the information on the states of the disc can be alternately recorded starting from a beginning physical cluster or ECC block of the drive & disc zone 10$d$. On the other hand, as described with reference to FIG. 6B, where the drive & disc zone 10$d$ is divided into two zones, at least one of information on the used drives and information on the states of the disc may be sequentially recorded in physical clusters or ECC blocks of a front zone and the remaining information may be sequentially recorded in physical clusters or ECC blocks of the remaining zone. In other words, at least one of information on a new drive and information on a new state of the disc is recorded in a front one of the two divided zones, and the remaining information is recorded in the remaining zone. As described above, information on used drives and information on states of a disc can be recorded using various methods of the present invention.

Where information on a new drive is recorded and information on a state of a disc is updated, only the updated information may be recorded and information on a previous state of the disc may not be recorded. The information on the new drive may be recorded together with information on a previous drive.

As shown in FIG. 7A, updated information on a state of a disc may be recorded in a $0^{th}$ recording unit of a new physical cluster and information on a new drive may be recorded in a first recording unit of the new physical cluster. Also, information on previous drives may be sequentially copied starting from a second recording unit. As a result, a drive & disc zone can be efficiently used by recording only updated information on the state of the disc.

As shown in FIG. 8A, updated information on a drive may be recorded in a $0^{th}$ recording unit of a predetermined physical cluster, and information on a previous drive may be copied. Updated information on the state of a disc may be recorded in a last recording unit of the predetermined physical cluster. As shown in FIG. 9, information on a new drive and information on a previous drive may be recorded, and updated information on a disc may be recorded in a recording unit right after a recording unit in which information on a drive is lastly recorded.

In an information storage medium, for example, a disc, and a method of recording information thereon according to the present invention, zones in which information on drives and information on states of a disc can be efficiently used. Also, the information on the drives and the information on the states of the disc can be used in a new format.

In addition, the information storage medium and the method of recording information thereon according to the present invention can be applied to once-writable information storage media as well as several-time-rewritable information storage media. In particular, where information on a drive and information on a state of a disc are recorded on a once-writable information storage medium, the information on the drive and the information on the state of the disc can be recorded only one time in a physical cluster or ECC block. Thus, where information on a new drive and information on a new state of the disc are recorded, the physical cluster or ECC block in which the information on the drive and the information on the state of the disc cannot be used. Instead, the information on the new drive and the information on the new state of the disc should be recorded in a physical cluster or ECC block right after a physical cluster or ECC block in which information on a last drive and information on a last state of the disc are recorded. Therefore, it is advantageous to apply the present method of recording information to an once-writable information storage medium.

Moreover, in a case of a several-time-rewritable information storage medium, information on previous drives and information on previous states of the disc are recorded in a zone in which information on a last drive and information on a last state of the disc are recorded. Thus, a drive & disc zone can be efficiently managed by reproducing only the zone in which the information on the last drive and the information on the last state of the disc are recorded.

Furthermore, whenever a recording of user data is completed, information on a latest state of a disc is recorded. Thus, a pickup can rapidly access an exact position in which user data is to be recorded next time. As a result, since user data can be recorded using the information on the latest state of the disc, recording/reproduction efficiency is improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An information storage medium comprising:
an area including a recordable zone having a drive & disc zone in which information on a drive and information on a state of the storage medium are recorded;
a user data area, wherein:
the drive & disc zone includes a plurality of physical clusters or error correction code (ECC) blocks,
the information on the drive and the information on the state of the storage medium are recorded in at least one of the physical clusters or error correction code (ECC) blocks, and
when the information on the drive and/or the information on the state of the storage medium are updated, the updated information is recorded in a physical cluster or ECC block different from a physical cluster or ECC block in which information on a previous drive and information on a previous state of the storage medium are recorded.

2. The information storage medium of claim 1, wherein whenever the information on the drive and the information on the state of the storage medium are updated, the updated information is recorded in a physical cluster or ECC block right after a physical cluster or ECC block in which the information on the previous drive and the information on the previous state of the storage medium are recorded.

3. The information storage medium of claim 1, wherein:
each of the plurality of physical clusters or ECC blocks comprises a plurality of recording units, and
the information on the drive and the information on the state of the storage medium are sequentially recorded in different recording units of a physical cluster or ECC block.

4. The information storage medium of claim 1, wherein:
each of the plurality of physical clusters or ECC blocks comprises a plurality of recording units, and
the information on the drive and the information on the state of the storage medium are recorded in the same recording unit of a physical cluster or ECC block.

5. The information storage medium of claim 3, wherein the plurality of recording units are sectors or data frames.

6. The information storage medium of claim 3, wherein the information on the drive and the information on the state of the storage medium are copied into a physical cluster or ECC block following a physical cluster or ECC block in which the information on the drive and the information on the state of the storage medium are recorded.

7. The information storage medium of claim 3, wherein information on a new drive and information on a latest state of the storage medium are recorded in a starting recording unit of a physical cluster or ECC block, and the information on the drive and the information on the state of the storage medium are copied into a recording unit right after the starting recording unit.

8. The information storage medium of claim 1, wherein the information on the state of the storage medium comprises at least one of an address of a zone in which new optimum power control (OPC) data is recorded, an address of a zone in which information on a last drive and information on a latest state of the storage medium are recorded, a last recorded address of a zone in which user data is lastly recorded, information on a number of sessions, write protection information, and information for indicating whether additional user data is recordable after recording the user data.

9. The information storage medium of claim 1, wherein the information on the state of the storage medium comprises at least one of information on a recording mode, information on a type of a file system, information on a recording layer on which user data is recorded, a last recorded address of a zone which the user data is lastly recorded, and a last replaced address of a spare area in which data is replaced to manage defects.

10. The information storage medium of claim 1, wherein the information on the state of the storage medium comprises information necessary for indicating an address of a zone in which information on a subsequent drive and information on a subsequent state of the storage medium are to be recorded or information necessary for indicating an address of a zone in which user data is to be recorded.

11. The information storage medium of claim 1, wherein the area is at least one of a lead-in area and a lead-out area.

12. A method of recording with respect to an information storage medium, the method comprising:
recording information on a drive and information on a state of the storage medium in one of a plurality of physical clusters or ECC blocks of a drive & disc zone of a recordable zone included in an area except a user data area of the storage medium; and
recording information on a new drive and information on a latest state of the storage medium in a physical cluster or ECC block different from a physical cluster or ECC block in which the information on the drive and the information on the state of the storage medium are recorded, whenever the information on the drive and the information on the state of the storage medium are updated;

wherein, whenever the information on the drive and/or the information on the state of the storage medium are updated, the updated information is recorded in a physical cluster or ECC block different from a physical cluster or ECC block in which information on a previous drive and information on a previous state of the storage medium are recorded.

13. The method of claim 12, wherein:

each of the plurality of physical clusters or ECC blocks comprises a plurality of recording units, and the recording of the information on the drive and the information on the state of the storage medium comprises sequentially recording the information on the drive and the information on the state of the storage medium in different recording units of a physical cluster or ECC block.

14. The method of claim 12, wherein:

each of the plurality of physical clusters or ECC blocks comprises a plurality of recording units, and the recording of the information on the drive and the information on the state of the storage medium comprises recording the information on the drive and the information on the state of the storage medium in the same recording unit of a physical cluster or ECC block.

15. The method of claim 13, wherein the plurality of recording units are sectors or data frames.

16. The method of claim 13, further comprising copying the information on the drive and the information on the state of the storage medium into a physical cluster or ECC block following a physical cluster or ECC block in which the information on the drive and the information on the state of the storage medium are recorded.

17. The method of claim 13, wherein:

the recording of the information on the new drive and the information on the latest state of the storage medium comprises recording the information on the new drive and the information on the latest state of the storage medium in a starting recording unit of the physical cluster or ECC block, and the method of recording with respect to the storage medium further comprises copying the information on the drive and the information on the state of the storage medium into a recording unit right after the starting recording unit.

18. The method of claim 12, wherein the information on the state of the storage medium comprises at least one of an address of a zone in which new optimum power control (OPC) data is recorded, an address of a zone in which information on a last drive and information on a latest state of the storage medium are recorded, a last recorded address of a zone in which user data is lastly recorded, information on a number of sessions, write protection information, and information for indicating whether additional user data is recordable after recording the user data.

19. The method of claim 12, wherein the information on the state of the storage medium comprises at least one of information on a recording mode, information on a type of a file system, information on a recording layer on which user data is recorded, a last recorded address of a zone which the user data is lastly recorded, and a last replaced address of a spare area in which data is replaced to manage defects.

20. The method of claim 12, wherein the information on the state of the storage medium comprises information necessary for indicating an address of a zone in which information on a subsequent drive and information on a subsequent state of the storage medium are to be recorded or information necessary for indicating an address of a zone in which user data is to be recorded.

21. The method of claim 12, wherein the area is at least one of a lead-in area and a lead-out area.

22. An information storage medium comprising:

an area including a recordable zone having a drive & disc zone in which information on a drive and information on a state of the storage medium are recorded; and a user data area, wherein:

the drive & disc zone includes a plurality of physical clusters or error correction code (ECC) blocks, wherein updated information on the drive and updated information on the state of the storage medium are recorded in a physical cluster or ECC block following a physical cluster or ECC block in which the information on the drive and the information on the state of the storage medium are recorded, the information on the drive is copied into the physical cluster or ECC block having the updated information on the drive and the updated information on the state of the storage medium, and when the information on the drive and/or the information on the state of the storage medium are updated, the updated information is recorded in a physical cluster or ECC block different from a physical cluster or ECC block in which information on a previous drive and information on a previous state of the storage medium are recorded.

23. The information storage medium of claim 22, wherein:

the updated information on the state of the disc is recorded in a $0^{th}$ recording unit of a predetermined physical cluster or ECC block, the updated information on the drive is recorded in a first recording unit right after the $0^{th}$ recording unit, and information on previous drives is sequentially copied into recording units after the first recording unit.

24. The information storage medium of claim 22, wherein:

the updated information on the drive is recorded in a $0^{th}$ recording unit of a predetermined physical cluster or ECC block, information on previous drives is sequentially copied into recording units after the $0^{th}$ recording unit, and the updated information on the state of the storage medium is recorded in a recording unit right after a last one of the recording units into which the information on the previous drives is copied.

25. The information storage medium of claim 22, wherein the updated information on the state of the storage medium is recorded in one of recording units included in each of the plurality of physical clusters or ECC blocks.

26. The information storage medium of claim 22, wherein the information on the drive and the information on the state of the storage medium are copied into a physical cluster or ECC block following a physical cluster or ECC block in which the information on the drive and the information on the state of the storage medium are recorded.

27. The information storage medium of claim 22, wherein the drive & disc zone is included in at least one of a lead-in area and a lead-out area of the storage medium.

28. A method of recording with respect to an information storage medium, the method comprising:
recording information on a state of the storage medium and information on a drive in one of a plurality of physical clusters or ECC blocks of a drive & disc zone of a recordable zone included an area except a user data area of the storage medium;
recording updated information on the state of the storage medium and updated information on the drive in a physical cluster or ECC block following the physical cluster or ECC block in which the information on the state of the storage medium and the information on the drive are recorded; and
copying the information on the drive after recording the updated information on the drive;
wherein, when the information on the drive and/or the information on the state of the storage medium are updated, the updated information is recorded in a physical cluster or ECC block different from a physical cluster or ECC block in which information on a previous drive and information on a previous state of the storage medium are recorded.

29. The method of claim 28, wherein:
the recording of the updated information on the state of the storage medium and the updated information on the drive comprises recording the updated information on the state in a $0^{th}$ recording unit of a predetermined physical cluster or ECC block and recording the updated information on the drive in a first recording unit right after the $0^{th}$ recording unit, and
the copying of the information on the drive includes sequentially copying information on previous drives into recording units after the first recording unit.

30. The method of claim 28, wherein:
the recording of the updated information on the drive comprises recording the updated information on the drive in a $0^{th}$ recording unit of a predetermined physical cluster or ECC block,
the copying of the information on the drive includes sequentially copying information on previous drives into recording units after the $0^{th}$ recording unit, and
the recording of the updated information on the state of the storage medium comprises recording the updated information on the state in a recording unit right after a last one of the recording units into which the information on the previous drives is copied.

31. The method of claim 28, wherein the updated information on the state of the storage medium is recorded in one of recording units included in each of the plurality of physical clusters or ECC blocks.

32. The method of claim 28, wherein the recording of the information on the state and the information on the drive includes copying the information on the drive and the information on the state of the storage medium into a physical cluster or ECC block following a physical cluster or ECC block in which the information on the drive and the information on the state of the storage medium are recorded.

33. The method of claim 28, wherein the drive & disc zone is included in at least one of a lead-in area and a lead-out area of the storage medium.

34. The information storage medium of claim 4, wherein the plurality of recording units are sectors or data frames.

35. The information storage medium of claim 4, wherein the information on the drive and the information on the state of the storage medium are copied into a physical cluster or ECC block following a physical cluster or ECC block in which the information on the drive and the information on the state of the storage medium are recorded.

36. The information storage medium of claim 4, wherein information on a new drive and information on a latest state of the storage medium are recorded in a starting recording unit of a physical cluster or ECC block, and the information on the drive and the information on the state of the storage medium are copied into a recording unit right after the starting recording unit.

37. The information storage medium of claim 1, wherein the information on the state of the storage medium comprises at least one of an address of a zone in which new optimum power control (OPC) data is recorded, an address of a zone in which information on a last drive and information on a latest state of the storage medium are recorded, a last recorded address of a zone in which user data is lastly recorded, information on a number of sessions, write protection information, and information for indicating whether additional user data is recordable after recording the user data.

38. The information storage medium of claim 1, wherein the information on the state of the storage medium comprises at least one of information on a recording mode, information on a type of a file system, information on a recording layer on which user data is recorded, a last recorded address of a zone which the user data is lastly recorded, and a last replaced address of a spare area in which data is replaced to manage defects.

39. The information storage medium of claim 1, wherein the information on the state of the storage medium comprises information necessary for indicating an address of a zone in which information on a subsequent drive and information on a subsequent state of the storage medium are to be recorded or information necessary for indicating an address of a zone in which user data is to be recorded.

40. The method of claim 14, wherein the plurality of recording units are sectors or data frames.

41. The method of claim 14, further comprising copying the information on the drive and the information on the state of the storage medium into a physical cluster or ECC block following a physical cluster or ECC block in which the information on the drive and the information on the state of the storage medium are recorded.

42. The method of claim 14, wherein:
the recording of the information on the new drive and the information on the latest state of the storage medium comprises recording the information on the new drive and the information on the latest state of the storage medium in a starting recording unit of the physical cluster or ECC block, and
the method of recording with respect to the storage medium further comprises copying the information on the drive and the information on the state of the storage medium into a recording unit right after the starting recording unit.

43. The method of claim 12, wherein the information on the state of the storage medium comprises at least one of an address of a zone in which new optimum power control (OPC) data is recorded, an address of a zone in which information on a last drive and information on a latest state of the storage medium are recorded, a last recorded address of a zone in which user data is lastly recorded, information on a number of sessions, write protection information, and information for indicating whether additional user data is recordable after recording the user data.

44. The method of claim 12, wherein the information on the state of the storage medium comprises at least one of information on a recording mode, information on a type of a file system, information on a recording layer on which user data is recorded, a last recorded address of a zone which the user data is lastly recorded, and a last replaced address of a spare area in which data is replaced to manage defects.

45. The method of claim 12, wherein the information on the state of the storage medium comprises information necessary for indicating an address of a zone in which information on a subsequent drive and information on a subsequent state of the storage medium are to be recorded or information necessary for indicating an address of a zone in which user data is to be recorded.

46. The information storage medium of claim 1, wherein the storage medium is a once-writable storage medium.

47. The information storage medium of claim 1, wherein the storage medium is a several-time-rewritable storage medium.

48. The information storage medium of claim 1, wherein the storage medium is an optical storage disc.

* * * * *